United States Patent
Roberts et al.

(10) Patent No.: US 10,181,618 B2
(45) Date of Patent: Jan. 15, 2019

(54) METHOD OF PREPARING A POROUS CARBON MATERIAL

(71) Applicants: Agency for Science, Technology and Research, Singapore (SG); The University of Liverpool, Liverpool (GB)

(72) Inventors: Aled Deakin Roberts, Liverpool (GB); Suxi Wang, Singapore (SG); Haifei Zhang, Liverpool (GB); Xu Li, Singapore (SG)

(73) Assignees: Agency for Science, Technology and Research, Singapore (SG); The University of Liverpool (GB)

( * ) Notice: Subject to any disclaimer, the term of this patent is extended or adjusted under 35 U.S.C. 154(b) by 0 days.

(21) Appl. No.: 15/329,829

(22) PCT Filed: Jul. 29, 2015

(86) PCT No.: PCT/SG2015/050241
§ 371 (c)(1),
(2) Date: Jan. 27, 2017

(87) PCT Pub. No.: WO2016/018192
PCT Pub. Date: Feb. 4, 2016

(65) Prior Publication Data
US 2017/0240424 A1    Aug. 24, 2017

(30) Foreign Application Priority Data
Jul. 29, 2014   (SG) .......................... 10201404439R

(51) Int. Cl.
*H01M 4/583* (2010.01)
*H01M 10/0525* (2010.01)
(Continued)

(52) U.S. Cl.
CPC ......... *H01M 10/0525* (2013.01); *B01J 20/20* (2013.01); *B01J 20/305* (2013.01);
(Continued)

(58) Field of Classification Search
CPC ... C01B 31/02; H01M 4/583; H01M 10/0525; H01M 2004/027; H01G 11/34; H01G 11/26; H01G 11/86
See application file for complete search history.

(56) References Cited

U.S. PATENT DOCUMENTS

| 5,300,272 A | 4/1994 | Simandl et al. |
| 5,358,802 A | 10/1994 | Mayer et al. |

(Continued)

FOREIGN PATENT DOCUMENTS

| CN | 102456876 A | 5/2012 |
| WO | 1994023462 A1 | 10/1994 |

(Continued)

OTHER PUBLICATIONS

International Preliminary Report on Patentability for International Application No. PCT/SG2015/050241 dated Jul. 14, 2016, pp. 1-17.
(Continued)

*Primary Examiner* — Daniel McCracken
(74) *Attorney, Agent, or Firm* — Winstead, P.C.

(57) ABSTRACT

A method of preparing a porous carbon material is provided. The method comprises a) freezing a liquid mixture comprising a polymer suspended or dissolved in a solvent to form a frozen mixture; b) removing the solvent from the frozen mixture to form a porous frozen mixture; and c) pyrolyzing the porous frozen mixture to obtain the porous carbon material. A porous carbon material prepared using the method, and uses of the porous carbon material are also provided.

20 Claims, 19 Drawing Sheets

(51) Int. Cl.
    *B01J 20/20*     (2006.01)
    *C01B 31/02*     (2006.01)
    *H01G 11/34*     (2013.01)
    *B01J 20/30*     (2006.01)
    *H01M 8/0234*     (2016.01)
    *C01B 32/00*     (2017.01)
    *C01B 32/05*     (2017.01)
    *H01M 4/587*     (2010.01)
    *H01M 10/052*     (2010.01)
    *H01M 4/92*     (2006.01)
    *H01G 11/26*     (2013.01)
    *H01G 11/86*     (2013.01)
    *H01M 4/02*     (2006.01)

(52) U.S. Cl.
CPC ....... *B01J 20/3078* (2013.01); *B01J 20/3085* (2013.01); *C01B 31/02* (2013.01); *C01B 32/00* (2017.08); *C01B 32/05* (2017.08); *H01G 11/34* (2013.01); *H01M 4/583* (2013.01); *H01M 8/0234* (2013.01); *H01G 11/26* (2013.01); *H01G 11/86* (2013.01); *H01M 4/587* (2013.01); *H01M 4/926* (2013.01); *H01M 10/052* (2013.01); *H01M 2004/027* (2013.01); *Y02C 10/08* (2013.01); *Y02E 60/13* (2013.01); *Y02T 10/7022* (2013.01)

(56) References Cited

U.S. PATENT DOCUMENTS

| | | |
|---|---|---|
| 8,158,556 B2 | 4/2012 | Feaver et al. |
| 8,222,308 B2 | 7/2012 | Cooper-White et al. |
| 8,293,275 B2 | 10/2012 | Truong-Le et al. |
| 8,293,818 B2 | 10/2012 | Costantino et al. |
| 2011/0028599 A1* | 2/2011 | Costantino ............. B82Y 30/00 523/309 |
| 2011/0091711 A1 | 4/2011 | Neivandt et al. |
| 2011/0262993 A1 | 10/2011 | Backov et al. |
| 2012/0234695 A1 | 9/2012 | Mayes et al. |
| 2013/0058858 A1 | 3/2013 | Uyama et al. |
| 2013/0183511 A1 | 7/2013 | Dai et al. |

FOREIGN PATENT DOCUMENTS

| | | |
|---|---|---|
| WO | 2008061212 A2 | 5/2008 |
| WO | 2012119666 A1 | 9/2012 |
| WO | 2013053679 A2 | 4/2013 |
| WO | 2013103801 A1 | 7/2013 |
| WO | 2014082086 A1 | 5/2014 |

OTHER PUBLICATIONS

Babie et al., "Characterization of Carbon Cryogel Synthesized by Sol-Gel Polycondensation and Freeze-Drying," Carbon, vol. 42, 2004, pp. 2617-2624.
Lee et al., "Synthesis and Rate Performance of Monolithic Macroporous Carbon Electrodes for Lithium-Ion Secondary Batteries," Advanced Functional Materials, vol. 15, No. 4, Apr. 2005, pp. 547-556.
Brun et al., "Design of Hierarchical Porous Carbonaceous Foams from a Dual-Template Approach and Their Use as Electrochemical Capacitor and Li Ion Battery Negative Electrodes," Journal of Physical Chemistry, vol. 116, 2012, pp. 1408-1421.
Brun et al., "Hard Macrocellular Silica Si(HIPE) Foams Templating Micro/Macroporous Carbonaceous Monoliths: Applications as Lithium Ion Battery Negative Electrodes and Electrochemical Capacitors," Advanced Functional Materials, vol. 19, 2009, pp. 3136-3145.
Hu et al., "Synthesis of Hierarchically Porous Carbon Monoliths with Highly Ordered Microstructure and Their Application in Rechargeable Lithium Batteries with High-Rate Capability," Advanced Functional Materials, vol. 17, 2007, pp. 1873-1878.
Doherty et al., "Hierarchically Porous Monolithic LiFePO4/Carbon Composite Electrode materials for High Power Lithium Ion Batteries," Chemistry of Materials, vol. 21, 2009, pp. 5300-5306.
Hasegawa et al., "Facile Preparation of Monolithic LiFePO4/Carbon Composites with Well-Defined Macropores for a Lithium-Ion Battery," Chemistry of Materials, vol. 23, 2011, pp. 5208-5216.
Qian et al., "Controlled Freezing and Freeze Drying: A Versatile Route for Porous and Micro-/Nano-Structured Materials," J. Chem. Technol. Biotechnol., vol. 86, 2011, pp. 172-184.
Gutierrez et al., "Ice-Templated Materials: Sophisticated Structures Exhibiting Enhanced Functionalities Obtained after Unidirectional Freezing and Ice-Segregation-Induced Self-Assembly," Chem. Mater, vol. 20, 2008, pp. 634-648.
Mukai et al., "Morphology of Resorcinol-Formaldehyde Gels Obtained Through Ice-Templating," Carbon, vol. 43, 2005, pp. 1557-1583.
Ouyang et al., "Scalable Preparation of Three-Dimensional Porous Structures of Reduced Graphene Oxide/Cellulose composites and their Application in Supercapacitors," Carbon, vol. 62, 2013, pp. 501-509.
Kraiwattanawong et al., "Capacitive Performance of Binder-Free Carbon/Carbon Composite Cryogels," Microporous and Mesoporous Materials, vol. 165, 2013, pp. 228-233.
Park et al., "Morphology Control of Three-Dimensional Carbon Nanotube Macrostructures Fabricated Using Ice-Templating Method," J. Porous Mater., vol. 20, 2013, pp. 1289-1297.
Nardecchia et al., "Three Dimensional Macroporous Architectures and Aerogels Built of Carbon Nanotubes and/or Graphene: Synthesis and Applications," Chem. Soc. Rev., vol. 42, 2013, pp. 794-830.
Abarrategi et al., "Multiwall Carbon Nanotube Scaffolds for Tissue Engineering Purposes," Biomaterials, vol. 29, 2008, pp. 94-102.
Xie et al., "Graphene-Sponges as High-Performance Low-Cost Anodes for Microbial Fuel Cells," Energy & Environmental Science, vol. 5, 2012, pp. 6862-6866.
Xie et al., "Large-Range Control of the Microstructures and Properties of Three-Dimensional Porous Graphene," Scientific Reports, vol. 3, No. 2117, 2013, pp. 1-6.
Zhang et al., "Aligned Two- and Three-Dimensional Structures by Directional Freezing of Polymers and Nanoparticles," Nature Materials, vol. 4, 2005, pp. 787-793.
Zhang et al., "Aligned Porous Structures by Directional Freezing," Advanced Materials, vol. 19, 2007, 1529-1533.
Katuri et al., "Three-Dimensional Microchanelled Electrodes in Flow-Through Configuration for Bioanode Formation and Current Generation," Energy & Environmental Science, vol. 4, 2011, pp. 4201-4210.
Wang et al., "Superwetting Monolithic Carbon with Hierarchical Structure as Supercapacitor Materials," Microporous and Mesoporous Materials, vol. 163, 2012, pp. 249-258.
Rose et al., "Hierarchical Micro- and Mesoporous Carbide-Derived Carbon as a High-Performance Electrode Material in Supercapacitors," Small, vol. 7, No. 8, 2011, pp. 1108-1117.
Ding et al., "Platinum and Platinum-Ruthenium Nanoparticles Supported on Ordered Mesoporous Carbon and Their Electrocatalytic Performance for Fuel Cell Reactions," Electrochimca Ada, vol. 50, 2005, pp. 3131-3141.
Nataraj et al., "Polyacrylonitrile-Based Nanotibers—A State-of-the-Art Review," Progess in Polymer Science, vol. 37, 2012, pp. 487-513.

\* cited by examiner

METHOD OF PREPARING A POROUS CARBON MATERIAL

CROSS-REFERENCE TO RELATED APPLICATION

This application claims the benefit of priority of Singapore patent application No. 10201404439R filed on 29 Jul. 2014, the content of which is incorporated herein by reference in its entirety for all purposes.

TECHNICAL FIELD

Various embodiments relate to a porous carbon material and method of preparing a porous carbon material.

BACKGROUND

High-capacity and low-cost energy storage systems are required for a plethora of emerging green technologies, including plug-in electric vehicles and large-scale renewable energy storage for smartgrids. Advanced lithium ion batteries (LIBs) are currently regarded as the most feasible systems to satisfy the challenges faced by the energy storage sector; however shortcomings such as high costs and limited energy and power density are restricting their application. Advanced materials, with novel and cost-effective fabrication procedures, are required to overcome these challenges and open up new and exciting markets.

An area of intense research in the field of lithium ion batteries (LIBs) is that of the anode. Since commercialization, graphitic carbon has been the anode material of choice due to its relatively low cost and reasonable performance (maximum theoretical capacity of 372 $mAhg^{-1}$). With the rapid growth of power hungry smart-phones and other portable electronics, as well as the growing electric vehicle and hybrid-electric vehicle markets, however, there is a substantial drive to develop new anode materials with higher energy densities and improved electrochemical performances. One of the most active areas is on the development of porous carbon and carbon composite materials.

Porous carbon materials may be prepared by templating methods using polymeric gels, hard templates such as silica spheres, porous inorganic scaffold, and particles leaching, or soft templates such as emulsion templating, polymer spheres, and foaming processes. Commercialization of the materials and processes has been restricted, however, due to high costs and complexities associated with fabrication and subsequent removal of the templating agents.

In view of the above, there is a need for an improved method to obtain a porous carbon material which overcomes or alleviates one or more of the above-mentioned problems.

SUMMARY

In a first aspect, a method of preparing a porous carbon material is provided. The method comprises
a) freezing a liquid mixture comprising a polymer suspended or dissolved in a solvent to form a frozen mixture;
b) removing the solvent from the frozen mixture to form a porous frozen mixture; and
c) pyrolyzing the porous frozen mixture to obtain the porous carbon material.

In a second aspect, an electrode comprising a porous carbon material prepared by a method according to the first aspect is provided.

In a third aspect, use of a porous carbon material prepared by a method according to the first aspect is provided. The porous carbon material may be used as an electrode in energy storage or conversion system such as supercapacitors and fuel cells, a substrate for water purification, a substrate for gas separation, carbon dioxide storage, or hydrogen storage.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
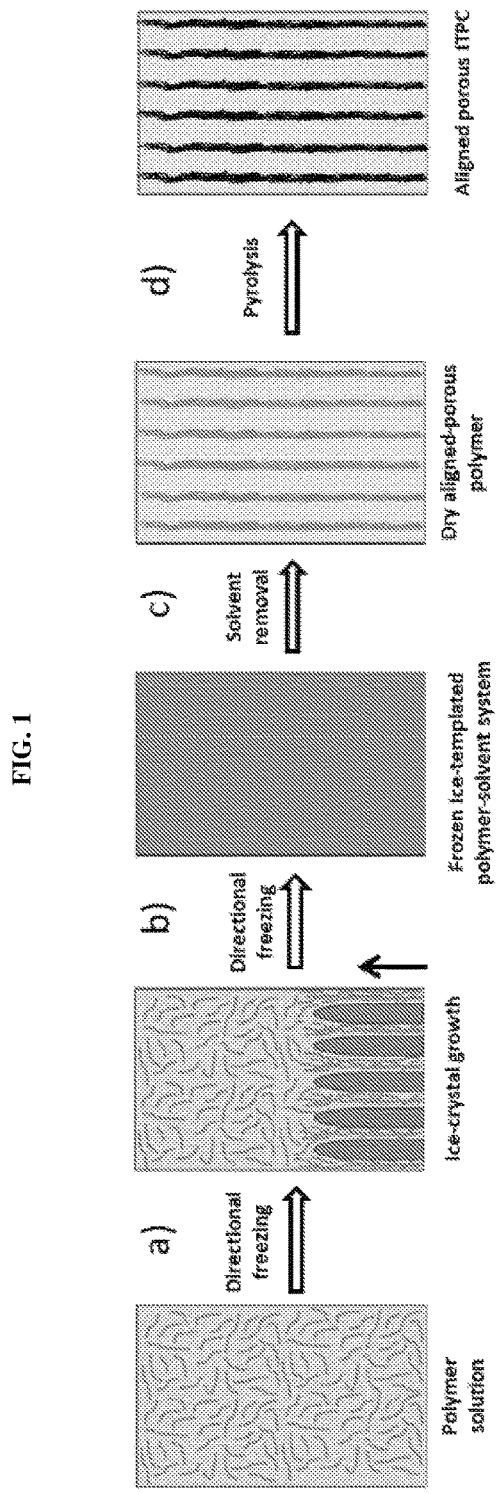
FIG. 1 is a schematic diagram showing preparation of aligned-porous ice-template derived porous carbons (ITPCs) by directional freezing of polymer solutions according to embodiments. The process involves (a) and (b) directional freezing of the polymer solution by submersion into a cold liquid nitrogen ($LN_2$) bath; (c) removal of the solvent by lyophilization or solvent exchange; and (d) thermal annealing and pyrolysis.

In a first aspect, a method of preparing a porous carbon material is provided. The method comprises freezing a liquid mixture comprising a polymer suspended or dissolved in a solvent to form a frozen mixture; removing the solvent from the frozen mixture to form a porous frozen mixture; and pyrolyzing the porous frozen mixture to obtain the porous carbon material.

Advantageously, various polymers with high molecular weights such as polyacrylonitrile and poly(sodium 4-styrenesulfonate), which are generally unsuitable for use in state of the art templating methods, may be used in a method disclosed herein. The method has flexibility with regard to type of polymer, solvent and additives used, and morphology of the resultant porous carbon material such as (freestanding) monolith, micrometer sized particles in the form of powder, or thin (sub-millimeter) mat. This translates into a large product range for use in applications, for example energy storage such as batteries, electrode materials for supercapacitors and fuel cells, as substrate in separation such as water purification, carbon dioxide and hydrogen gas storage. Further, the flexibility in processing and simplicity in execution also provides potential for further performance enhancement and/or cost reduction during manufacturing. Further, use of a directional freezing method according to embodiments disclosed herein may result in formation of a porous carbon material having an aligned pore structure. Advantageously, such aligned porous materials are able to provide enhanced transport and improved performance in applications such as in electrodes.

The method comprises freezing a liquid mixture comprising a polymer suspended or dissolved in a solvent to form a frozen mixture. The solvent may be an organic solvent or an aqueous solution.

In various embodiments, the solvent is an organic solvent. As used herein, the term "organic solvent" refers to a solvent containing carbon atom(s) and which is capable of at least partially dissolving another substance. Examples of organic solvent include, but are not limited to acetone, alcohol, benzene, benzol, carbon tetrachloride, carbon disulphide, chloroform, ether, ethyl acetate, gasoline, furfural, toluene, turpentine, xylene, xylol, octadecane, tetracosane, oleic acid or oleylamine.

In various embodiments, the solvent is selected from the group consisting of dimethyl sulfoxide, dimethylforamide, dioxane, halogenated alkanes, maleic anhydride, propylene carbonate, dimethylacetamide, tetramethylene sulfone, gamma-butyrolactone, and combinations thereof. In some embodiments, the solvent comprises or consists of dimethyl sulfoxide (DMSO).

In embodiments where the solvent is an organic solvent, a suitable polymer may be one that is able to dissolve in the organic solvent. Therefore, different polymers may be suitable depending on the organic solvent used. In various embodiments, the polymer may be selected from the group consisting of polyacrylonitrile, polymethylacrylonitrile, polypyrrole, polystyrene, polyaromatic hydrocarbons, copolymers thereof, and combinations thereof.

In some embodiments, the polymer comprises or consists of polyacrylonitrile (PAN). The liquid mixture may, for example, comprise polyacrylonitrile dissolved in dimethyl sulfoxide. Advantageously, dimethyl sulfoxide has low toxicity and a high melting point of about 16° C., which renders it suitability for freeze-drying. Further, it is able to dissolve polyacrylonitrile to a high degree at room temperature. For example, polyacrylonitrile solutions having a concentration of polyacrylonitrile of more than 250 mg ml$^{-1}$ may be prepared. The viscous nature of polyacrylonitrile/dimethyl sulfoxide solutions allows easy suspension of additives such as silicon nanoparticles, metal nanoparticles, metal-oxide nanoparticles, carbon nanotubes (CNTs), or graphene, to name only a few, for fabrication of carbon composite materials.

Besides organic solvents, an aqueous solution such as water may also be used as the solvent. In various embodiments, the solvent is an aqueous solution. Suitable polymers may include hydrophilic polymers, for example, naturally occurring polymers such as gelatin, albumin, starch, cellulose derivatives, or agarose gel, or synthetic polymers such as poly(alkylene oxide) or polyethylene glycol.

In various embodiments, the polymer is selected from the group consisting of poly(sodium 4-styrenesulfonate), chitosan, alginate, glucose, sucrose, lignin, polysaccharides, copolymers thereof, and combinations thereof. The liquid mixture may, for example, comprise poly(sodium 4-styrenesulfonate) dissolved in water. Advantageously, poly(sodium 4-styrenesulfonate) (PSS), despite being a polymer with a high degree of conjugation, is highly soluble in water. For example, poly(sodium 4-styrenesulfonate) solutions having a concentration of poly(sodium 4-styrenesulfonate) of more than 300 mg ml$^{-1}$ may be prepared. Poly(sodium 4-styrenesulfonate) is also an excellent stabilizer, which is capable of suspending, for example, CNTs and graphene to a relatively high degree in aqueous solution. Further, water is a benign and inexpensive solvent which may be freeze-dried easily.

Concentration of the polymer in the liquid mixture may be in the range of about 0.1 wt % to the saturation point of the polymer in the solvent. Saturation point of the polymer in the solvent may vary depending on the polymer and solvent used, as well as temperature of the liquid mixture.

In various embodiments, concentration of the polymer in the liquid mixture is in the range of about 0.5 wt % to about 50 wt %. For example, concentration of the polymer in the liquid mixture may be in the range of about 1 wt % to about 50 wt %, about 5 wt % to about 50 wt %, about 10 wt % to about 50 wt %, about 20 wt % to about 50 wt %, about 25 wt % to about 50 wt %, about 35 wt % to about 50 wt %, about 0.5 wt % to about 40 wt %, about 0.5 wt % to about 30 wt %, about 0.5 wt % to about 20 wt %, about 1 wt % to about 30 wt %, about 5 wt % to about 20 wt %, or about 1 wt % to about 15 wt %. In some embodiments, concentration of the polymer in the liquid mixture is in the range of about 0.5 wt % to about 50 wt %, preferably about 1 wt % to about 30 wt %.

Although a liquid mixture comprising a polymer suspended in a solvent may be used to prepare the porous carbon material, in preferred embodiments, the polymer is dissolved in the solvent to form a homogenous solution. To improve on dissolution of the polymer the liquid mixture may be heated and/or mechanically agitated such as by stirring, so that the polymer may dissolve more readily in the solvent. In embodiments wherein the solvent is an aqueous solution, an acid or a base may be added to the liquid mixture to improve on dissolution of the polymer in the aqueous solvent.

Regardless of the type of solvent used, molecular weight of the polymer may be in the range of about 50,000 g/mol to about 300,000 g/mol. As mentioned above, various polymers with high molecular weights such as polyacrylonitrile and poly(sodium 4-styrenesulfonate), are generally unsuitable for use in state of the art templating methods as the high molecular weight may hinder diffusion into template pores, and may thereby result in a defective carbon structure.

In various embodiments, molecular weight of the polymer may be in the range of about 70,000 g/mol to about 300,000 g/mol, such as about 100,000 g/mol to about 300,000 g/mol, about 150,000 g/mol to about 300,000 g/mol, about 50,000 g/mol to about 150,000 g/mol, about 50,000 g/mol to about 100,000 g/mol, about 100,000 g/mol to about 150,000 g/mol, or about 125,000 g/mol to about 175,000 g/mol. The molecular weight may be the weight average molecular weight ($M_w$), which may be determined using sum of the products of fraction weights and molecular weights divided by the sum of the weights of the individual fractions. The molecular weight $M_w$ may be determined using any known method, including, but not limited to gel permeation chromatography (GPC). One example may be GPC with tetrahydrofuran (THF) as eluent according to DIN 55672-1: 2007-08, and may be carried out with measurement conditions of 35° C. For calibration, polymethylmethacrylate standards may be used to determine the apparent molecular weights.

In specific embodiments, molecular weight of the polymer is in the range of about 50,000 g/mol to about 300,000 g/mol, preferably about 70,000 g/mol to about 150,000 g/mol.

The method of preparing a porous carbon material comprises freezing the liquid mixture to form a frozen mixture. Freezing the liquid mixture may include submersing the liquid mixture in liquid nitrogen.

In various embodiments, submersing the liquid mixture in liquid nitrogen comprises gradually submersing a container containing the liquid mixture at a rate of about 1 mm/min to about 100 mm/min in liquid nitrogen to directional freeze the liquid mixture along the direction of movement of the container. An exemplary embodiment of how this may be carried out is depicted in FIG. 1. In so doing, following subsequent removal of solvent and pyrolysis, a porous carbon material having an aligned pore structure may be obtained. Advantageously, such aligned porous materials are able to provide enhanced transport and improved performance in applications such as in electrodes.

In some embodiments, the container containing the liquid mixture is gradually submersed in liquid nitrogen at a rate in the range of about 5 mm/min to about 100 mm/min, such as about 10 mm/min to about 100 mm/min, about 25 mm/min to about 100 mm/min, about 50 mm/min to about 100 mm/min, about 75 mm/min to about 100 mm/min, about 1 mm/min to about 75 mm/min, about 1 mm/min to about 50 mm/min, about 1 mm/min to about 25 mm/min, about 25 mm/min to about 75 mm/min, or about 40 mm/min to about 60 mm/min.

Figure 2:
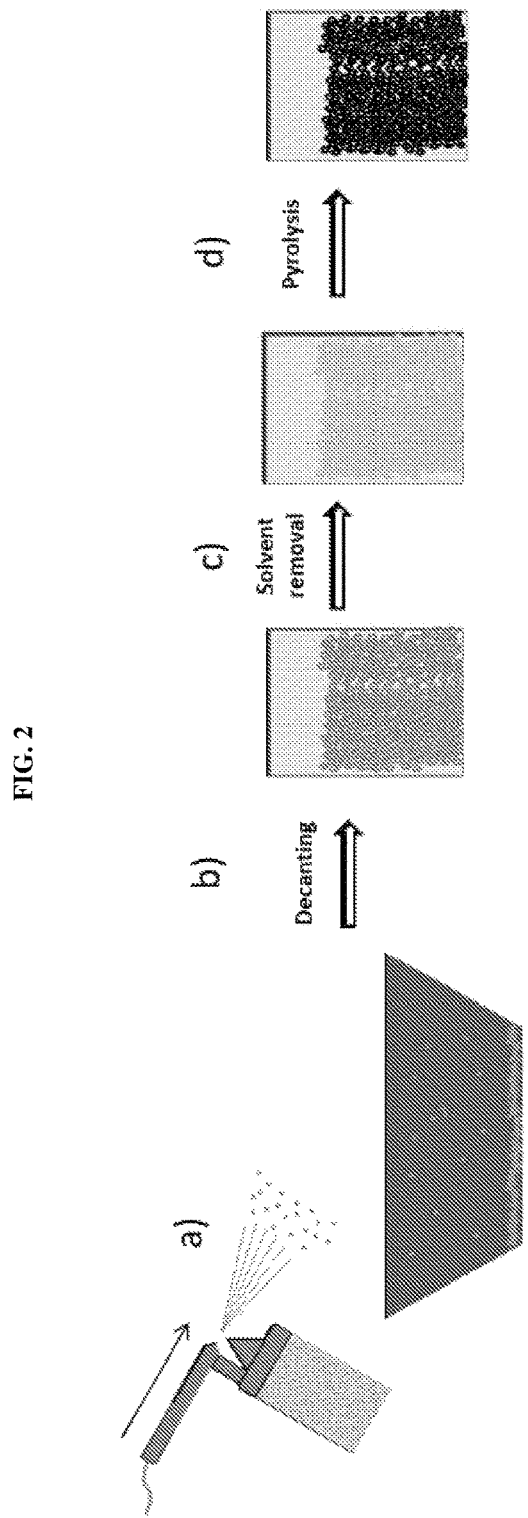
FIG. 2 is a schematic diagram showing preparation of ITPC microbeads according to embodiments, including steps of (a) atomization of a polymer solution into a $LN_2$ bath; (b) decanting excess $LN_2$; (c) removing solvent by lyophilization or solvent exchange; and (d) thermal annealing and pyrolysis.

Apart from the above, which may be suitable for preparing porous carbon material in a thin mat or monolithic form, freezing the liquid mixture may include submersing the liquid mixture in liquid nitrogen by atomizing the liquid mixture in the liquid nitrogen to form the frozen mixture. This may be suitable for preparing porous carbon material in a microparticle form. An exemplary embodiment of how this may be carried out is depicted in FIG. 2. As used herein, the term "atomizing" means to reduce or to separate a liquid into tiny droplets or into a fine spray. By atomizing or spray freezing the liquid mixture in liquid nitrogen, the liquid mixture is separated into tiny droplets which may immediately be frozen by the liquid nitrogen environment to form microparticles. As such, the frozen mixture may comprise or consist of microparticles.

Upon formation of the frozen mixture, the solvent is removed from the frozen mixture to form a porous frozen mixture. Removing the solvent from the frozen mixture may comprise at least one of (i) freeze drying the frozen mixture, or (ii) solvent exchange and vacuum drying the frozen mixture.

In various embodiments, removing the solvent from the frozen mixture comprises freeze drying the frozen mixture. Freeze drying, otherwise known as lyophilization or cryodesiccation, refers to a process by solvent is removed by sublimation, involving direct transformation of the solvent in solid form to gaseous form, under vacuum. Advantageously, besides providing a versatile route for solvent removal from the frozen mixture, freeze drying may prevent shrinkage of the frozen mixture, and maintain a highly interconnected porous structure in the resultant porous carbon material.

Removing the solvent from the frozen mixture may alternatively or additionally be carried out by solvent exchange and vacuum drying the frozen mixture. A person skilled in the art is able to determine the type of reagent for solvent exchange as this may depend on the solvent used. For example, when dimethyl sulfoxide is used as the solvent, chilled water may be used as the reagent for solvent exchange to remove dimethyl sulfoxide from the frozen mixture.

Vacuum drying the frozen mixture may take place at a suitable temperature that is able to drive away the reagent used in the solvent exchange. In the embodiment mentioned above, when chilled water is used as the reagent for solvent exchange for example, vacuum drying the frozen mixture may take place at a temperature in the range of about 40° C. to about 80° C., such as in the range of about 40° C. to about 60° C., about 60° C. to about 80° C., about 50° C. to about 70° C., or 50° C. to about 60° C.

The porous frozen mixture thus formed is pyrolyzed to obtain the porous carbon material. As used herein, the term "pyrolyzing" or "pyrolysis" refers to thermal decomposition of a carbon-containing material in the absence of, or with a limited supply of an oxygen containing gas. This may include drying and partial thermal decomposition of the carbon-containing material, through to complete decomposition of the carbon-containing material into gaseous, liquid and solid decomposition products.

In various embodiments, pyrolyzing the porous frozen mixture include heating the porous frozen mixture in an inert environment, such as in an argon environment, at a temperature in the range of about 600° C. to about 3000° C. For example, heating the porous frozen mixture in an inert environment may take place at a temperature in the range of about 800° C. to about 3000° C., about 1000° C. to about 3000° C., about 1500° C. to about 3000° C., about 2000° C. to about 3000° C., about 600° C. to about 2000° C., about 600° C. to about 1500° C., about 600° C. to about 1000° C., about 800° C. to about 1500° C., or about 700° C. to about 900° C.

In specific embodiments, pyrolyzing the porous frozen mixture includes heating the porous frozen mixture in an inert environment at a temperature in the range of about 600° C. to about 3000° C., preferably about 800° C.

Prior to the pyrolysis, the porous frozen mixture may optionally be thermally annealed at a temperature not exceeding 280° C. The thermal annealing may take place in air, and may optionally be carried out to improve stability of the resultant porous structure, as this may induce cross-linking of the polymer chains so as to prevent melting upon pyrolysis.

In various embodiments, thermally annealing the porous frozen mixture is carried out at a temperature in the range of about 100° C. to about 280° C., such as about 150° C. to about 280° C., about 180° C. to about 280° C., about 200° C. to about 280° C., about 100° C. to about 250° C., about 150° C. to about 250° C., or about 150° C. to about 200° C.

The porous carbon material that is obtained may comprise turbostratic carbon. In some embodiments, the porous carbon material consists of turbostratic carbon. As used herein, the term "turbostratic carbon" refers to crystalline carbon that forms a lamellar structure in which the basal planes have slipped sideways to one another, causing the spacing of the planes be greater than the spacing would be in a graphitic structure. Advantageously, the turbostratic carbon in the porous carbon material may impart improved or high tensile strength to the material.

In addition to the above-mentioned, one or more additives may be incorporated into the porous carbon material to form a porous carbon composite material. This may be carried out, for example, by incorporating the additive in the liquid mixture, where it may be dissolved or suspended in the liquid mixture. Advantageously, this may be carried out with relative ease and circumvents complications and issues faced using typical templating procedures.

The term "additive" as used herein refers to a substance that is added so as to impact specific characteristics to the resultant porous carbon material. For example, the additive may be a nitrogen-rich organic compound such as melamine so as to induce nitrogen doping, which has been shown to result in improved current density in the resultant porous carbon material. As another example, the additive may be a carbon nanomaterial such as carbon nanotubes or graphene, which may improve electrical and/or thermal conductivity of the resultant porous carbon material.

In various embodiments, the additive is selected from the group consisting of silicon nanoparticles, metal nanoparticles, metal oxide nanoparticles, metal salts, nitrogen-rich organic compounds, carbon nanomaterials, and combinations thereof.

Examples of metal salts that may be used include $Sn(OAc)_2$, $FeCl_3$, $SnCl_2$, and/or iron gluconate.

Examples of nitrogen-rich organic compound include melamine and its derivatives such as melamine phosphate, melamine resins or melamine cyanurate, guanidines, cyanuric acid and derivatives, cyanamide, or benzoguanamine. Nitrogen containing organic compounds such as lysine or chitosan, albeit their lower nitrogen content, may also be used.

Examples of carbon nanomaterials include graphene, graphene oxide, and carbon nanotubes.

In specific embodiments, the additive is melamine or graphene.

Various embodiments refer in a second aspect to an electrode comprising the porous carbon material prepared by a method according to the first aspect. In some embodiments, the electrode is an anode of a lithium ion battery. As shown in the examples, the porous carbon material prepared by a method disclosed herein has displayed good performance as electrodes, such as anodes in lithium ion batteries, relative to other template-derived carbons. Advantageously, the method to prepare porous carbon material disclosed herein provides a significantly simpler and more cost-effective route.

In a third aspect, use of a porous carbon material prepared by a method according to the first aspect is provided. The porous carbon material may be used as an electrode in energy storage or conversion system such as batteries, supercapacitors and fuel cells, a substrate for water purification, a substrate for gas separation, carbon dioxide storage, or hydrogen storage.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Various embodiments disclosed herein relates to the field of nanostructured porous carbon or carbon composite materials derived from polymer solutions or suspensions via the so called 'ice-templating' means followed by pyrolysis. Specifically, this method employs the inexpensive frozen solvent crystals to act as templates to direct the formation of porous polymer monoliths or microparticles which are subsequently converted to carbon through high-temperature treatment.

As demonstrated herein, porous carbons are fabricated by directional freezing of polymer solutions (hence orientated frozen solvent crystals templating, both water and organic solvent) and doped carbon materials in a one-step processing. Both types of materials exhibit aligned macropores and mesopores/micropores, leading high porosity and high surface areas. Since porous carbons are widely employed for energy storage, e.g., supercapacitor electrodes, battery electrodes (references), fuel cell electrodes, the materials derived from the disclosed method are examined, showing high performance for Li-ion rechargeable batteries.

The resultant porous carbons have been assessed as anode materials for the lithium-ion batteries (LIBs), where they displayed high specific capacities up to 700 mA h $g^{-1}$ and good high-rate performance (over 200 mA h $g^{-1}$ at 10 A $g^{-1}$). The porous monolithic carbons or carbon microparticles may also have wide applications for a wide range of applications, not only as electrodes in energy storage or conversion systems (such as supercapacitors and fuel cells), but also as substrates for water purification, gas separation, carbon dioxide gas ($CO_2$) or hydrogen gas ($H_2$) storage, and so on.

Methods disclosed herein are simple to execute and involve use of inexpensive solvent crystals as templating agents, which facilitate scaling up of the process for commercialization. Moreover, the materials have been shown to outperform many state of the art materials. For instance, the materials obtained have relatively high reversible specific capacities and good high-rate performance when applied as anode in lithium ion batteries.

Flexibility of the methods disclosed herein has also been demonstrated, with a number of polymer-solvent systems having shown promise, and the potential to use renewable polymers such as lignin, cellulose as feedstocks. A wide range of entities, such as metal-salts (e.g. $Sn(OAc)_2$, iron gluconate, $FeCl_3$ and $SnCl_2$), organic compounds (e.g. melamine), nanoparticles (e.g. silicon) and nanocarbons such as graphene, graphene oxide and CNTs have all been incorporated within the materials with relative ease—further demonstrating the flexibility and wide-ranging scope of the methods.

Example 1

Preparing an Aligned-porous ITPC Monolith from a PAN in DMSO Solution (see FIG. 1 for Illustrative Scheme)

50 mg of PAN (MW 150,000) was dissolved into 1.1 g of DMSO and the mixture was stirred at 60° C. for 2 h. The solution was then left to cool naturally to room temperature (RT) under constant stirring, before being transferred to a disposable 10×75 mm borosilicate glass test-tube. The sample was then directionally immersed into a bath of $LN_2$ at a rate of 50 mm $min^{-1}$, before being transferred to a Vitris Advantage Benchtop freeze drier where it was lyophilized for 48 h at a shelf temperature of 4° C. After lyophilization, the sample was removed from the test-tube and transferred to a Carbolite CWF 1200 chamber furnace where it was oxidatively annealed by heating to 280° C. at a rate of 1° C. $min^{-1}$, and held at that temperature for 1 h. After being allowed to cool naturally, the sample was then pyrolyzed by heating to 800° C. (heat rate of 5° C. $min^{-1}$) under an argon (Ar) atmosphere, and held at that temperature for 2.5 hours before being left to cool to RT.

Example 2

Preparation of ITPC Microparticles from an Aqueous PSS Solution (see FIG. 2 for Illustrative Scheme)

1.5 g of sodium polystyrene sulfonate (PSS) (MW 70,000) was dissolved in 15 mL of deionized water and stirred at RT for 2 h. After dissolution, the solution was atomized using a commercially obtained paint atomizer, using propane gas as the propellant, into a Dewar of $LN_2$. Within seconds the droplets froze and sank to the bottom of the vessel. The frozen droplets were separated from excess $LN_2$ by decantation, before being transferred to a Vitris AdvantageBenchtopfreeze drier where they were lyophilized for 48 h at a shelf temperature of −2° C. The resulting dry microbeads of ice-templated PSS were then pyrolyzed by heating to 800° C. (heat rate of 5° C. $min^{-1}$) under an Ar atmosphere, and held at that temperature for 2.5 hours before being left to cool to RT. The resulting black powder was then subject to washes with excess hydrochloric acid (HCl) (2 M, ×3) and subsequently water (×3) to remove excess sodium and sulfur salts, before being dried overnight in a vacuum oven at 60° C.

Example 3

Preparation of an Aligned-porous ITPC Thin Mat from a PAN in DMSO Solution, Employing Solvent Exchange to Remove the Frozen DMSO Templates 50 mg of PAN (MW 150,000) was dissolved into 1.1 g of DMSO and the mixture was stirred at 60° C. for 2 h. The solution was then left to cool naturally to room temperature (RT) under constant stirring, before being cast (thickness about 1 mm) onto a sheet of steel foil. The steel foil was then held at the surface of a $LN_2$ bath, causing the thin layer of PAN in DMSO to freeze within seconds. The frozen sample was then placed in bath containing a large excess of chilled water (about 2° C.), and maintained at that temperature for 12 h. The sample was then removed and dried in a conventional vacuum oven at 60° C. for 2 h before being transferred to a Carbolite CWF 1200 chamber furnace where it was oxidatively annealed by heating to 280° C. at a rate of 1° C. $min^{-1}$, and held at that temperature for 1 h.

After being allowed to cool naturally, the sample was then pyrolyzed by heating to 800° C. (heat rate of 5° C. $min^{-1}$) under an Ar atmosphere, and held at that temperature for 2.5 hours before being left to cool to RT.

Example 4

Preparation of an Aligned Porous ITPC-Graphene Composite Monolith

Preparation of graphene: Initially 3 g of polystyrene sulfonate was dissolved in 20 ml of deionized water and stirred at RT for 2 hours. To this, 10 ml of an aqueous graphene oxide solution (commercially obtained, 5 mg ml$^{-1}$) was added, and the mixture was sonicated for 30 minutes. 2 ml of hydrazine hydrate (40% aqueous solution) was then added before the mixture was refluxed at 130° C. for 24 h. After cooling to RT, the suspension was treated to 3 cycles of centrifuging and washing with deionized water. The remaining supernatant (i.e. the graphene) was then re-dispersed in deionized water to a concentration of 3.3 mg ml$^{-1}$ and sonicated for a further 10 minutes.

Preparation of composite: 50 mg of PAN (MW 150,000) was dissolved into 1.1 g of DMSO and the mixture was stirred at 65° C. for 2 h. 50 μl of the above-prepared aqueous graphene solution was then added, and the stirring was continued for 1 h to obtain a homogenous dispersion. The solution was then left to cool naturally to room temperature (RT) under constant stirring, before being transferred to a disposable 10×75 mm borosilicate glass test-tube. The sample was then directionally immersed into a bath of LN$_2$ at a rate of 50 mm min$^{-1}$, before being transferred to a Vitris AdvantageBenchtopfreeze drier where it was lyophilized for 48 h at a shelf temperature of 4° C. After lyophilization, the sample was removed from the test-tube and transferred to a Carbolite CWF 1200 chamber furnace where it was oxidatively annealed by heating to 280° C. at a rate of 1° C. min$^{-1}$, and held at that temperature for 1 h. After being allowed to cool naturally, the sample was then pyrolyzed by heating to 800° C. (heat rate of 5° C. min$^{-1}$) under an Ar atmosphere, and held at that temperature for 2.5 hours before being left to cool to RT.

Example 5

Preparation an Aligned-porous Nitrogen-doped ITPC Monolith via the Incorporation of Melamine in the Polymer Samples 50 mg of PAN (MW 150,000) and 7.5 mg of melamine were dissolved into 1.1 g of DMSO and the mixture was stirred at 60° C. for 2 h. The solution was then left to cool naturally to room temperature (RT) under constant stirring, before being transferred to a disposable 10×75 mm borosilicate glass test-tube. The sample was then directionally immersed into a bath of LN$_2$ at a rate of 50 mm min$^{-1}$, before being transferred to a Vitris AdvantageBenchtopfreeze drier where it was lyophilized for 48 h at a shelf temperature of 4° C. After lyophilization, the sample was removed from the test-tube and transferred to a Carbolite CWF 1200 chamber furnace where it was oxidatively annealed by heating to 280° C. at a rate of 1° C. min$^{-1}$, and held at that temperature for 1 h. After being allowed to cool naturally, the sample was then pyrolyzed by heating to 800° C. (heat rate of 5° C. min$^{-1}$) under an Ar atmosphere, and held at that temperature for 2.5 hours before being left to cool to RT.

Example 6

Structure Characterization and Electrochemical Performance Testing

The morphologies were observed by a Hitachi S-4800 scanning electron microscope (SEM) equipped with an EDX detector. While the carbon samples were imaged directly without coating, the polymer samples were coated with gold using a sputter-coater (EMITECH K550X) for 2 minutes at 25 mA before imaging. The Brunauer-Emmett-Teller (BET) surface area and pore size by N$_2$ sorption at 77 K were measured using a Micromeritics ASAP 2420 adsorption analyzer. Mesopore size distributions were calculated by the Barrett-Joyner-Halenda (BJH) method from the desorption data.

Samples were degassed for 10 h at 120° C. before N$_2$ sorption analysis. The pore volume and macroporosity of the materials were measured using Hg intrusion porosimetry (Micromeritics Autopore IV 9500) in the pressure range of 0.10-60000 psia. Powder X-ray diffraction (PXRD) data were collected on a Panalytical X'Pert Pro Multi-Purpose Diffractometer in high-throughput transmission geometry. Cu anode operated at 40 kV and 40 mA. Samples were pressed into the well of aluminum plate. The PXRD patterns were collected over 5-50° 2 ⊖ with a scan time of 40 minutes.

Thermal stability of the materials was investigated by thermal gravimetric analysis (TGA, Model Q5000IR TGA, TA Instruments). Raman spectra were recorded on a Renishaw InVia instrument with a 633 nm laser that had been calibrated against a silicon wafer reference. The laser was focused on the samples using an inverted Leica microscope with a ×50 objective. The maximum laser power was 2 MW and scan range was between 100 and 3000 cm$^{-1}$.

After being grinded to fine powders, the electrochemical performance of the carbon monolith was evaluated as anode in lithium-ion batteries. The working electrode was fabricated by coating the slurry of the carbon sample (80 wt %), Super-P (Timcal, 10 wt %), and polyvinylidene fluoride (PVDF) (10 wt %) in N-methyl pyrrolidinone (NMP) onto a copper foil. The coated copper foil was dried under vacuum at 120° C. overnight and then assembled into 2032 button cells in an argon-filled glove box with lithium foil, Celgard 2325 membrane and 1 M LiPF$_6$ in ethylene carbonate/dimethyl carbonate (1:1 v/v ratio) as the counter electrode, separator and electrolyte, respectively. The charge-discharge testing was conducted on NEWARE battery tester at different current densities with a cutoff voltage window of 0.005-3.0 V.

Example 7

Discussion

Figure 3:
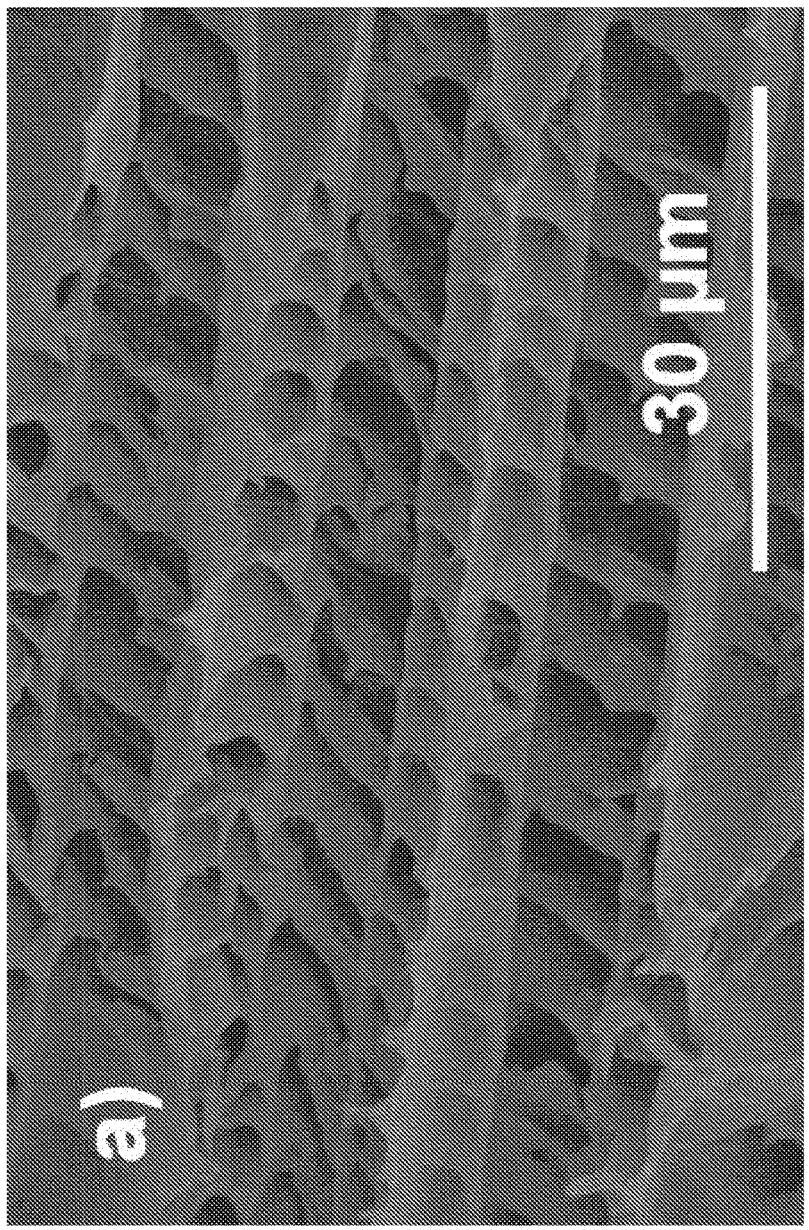
FIG. 3 shows typical scanning electron microscopy (SEM) images of directionally frozen and lyophilized polyacrylonitrile (PAN) in dimethyl sulfoxide (DMSO) (concentration 150 mg $ml^{-1}$) monolith (a) before; and (b) after thermal treatment and pyrolysis.
Figure 3:
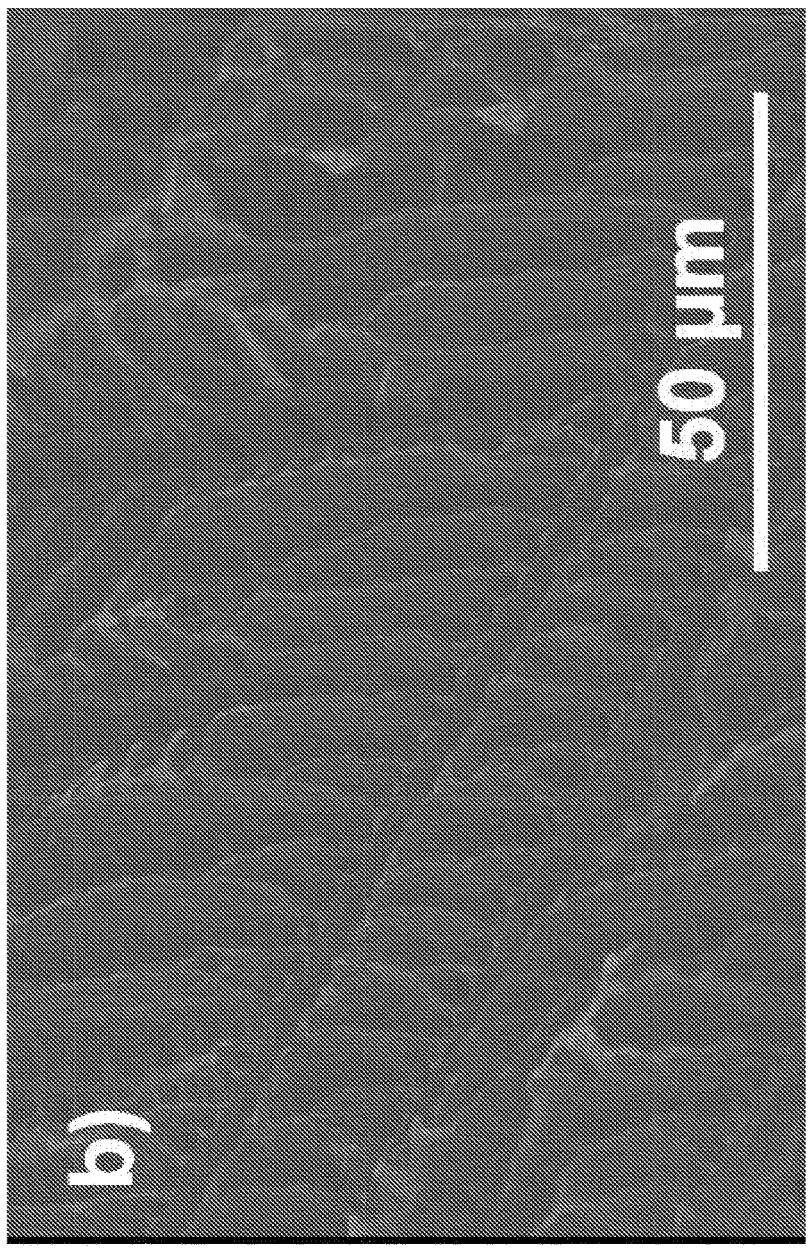
Figure 4:
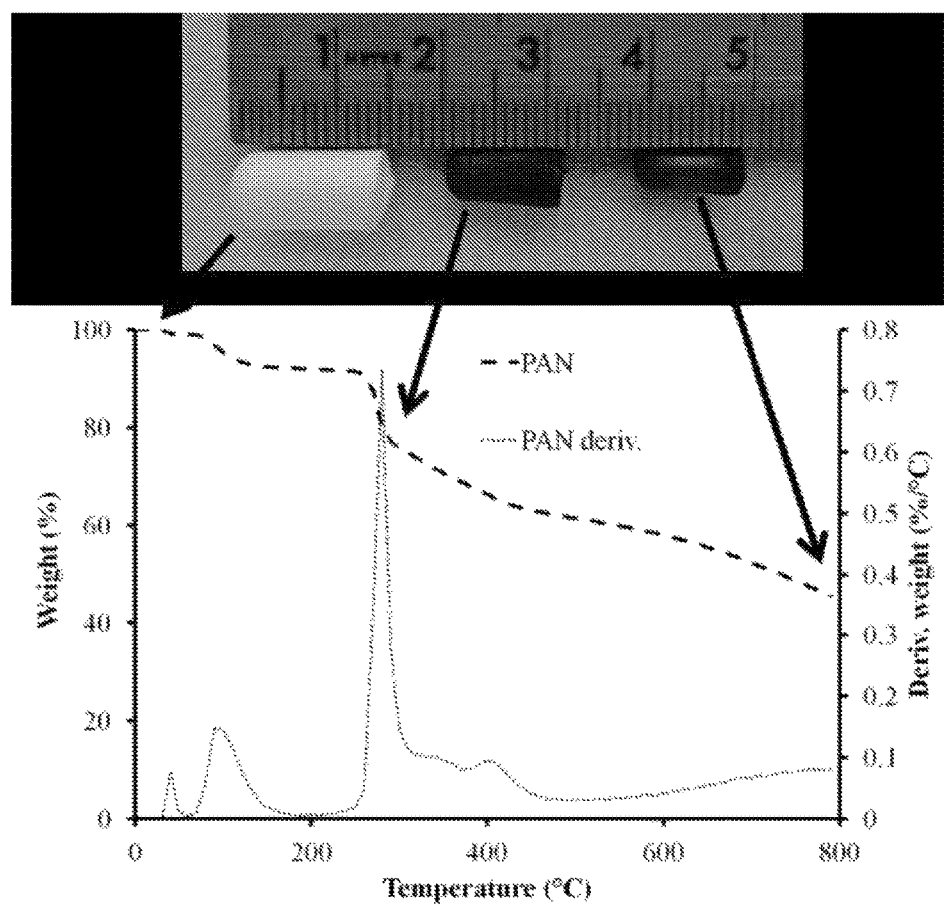
FIG. 4 shows a photograph and a thermogravimetric analysis (TGA) graph of the PAN depicting volume change and mass loss on thermal annealing and pyrolysis.

FIG. 3 shows typical SEM images of a directionally frozen and freeze-dried PAN in DMSO (concentration 150 mg ml$^{-1}$) monolith (a) before, and (b) after thermal treatment and pyrolysis. It may be seen that the aligned porous nature of the pores is retained, although shrinkage of about 60% by mass and volume is observed (FIG. 4).

Figure 5:
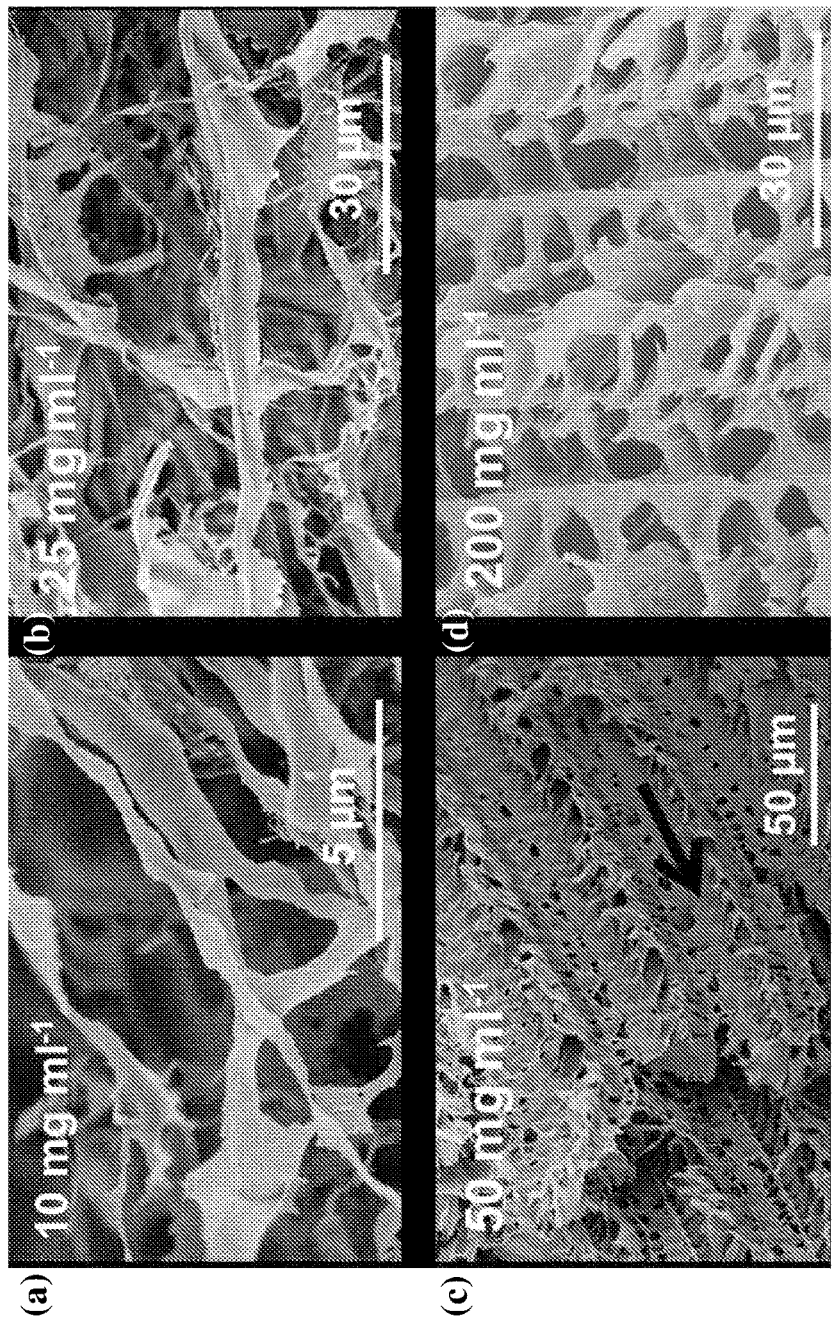
FIG. 5 shows SEM images of directionally frozen and lyophilized PAN in DMSO monoliths at various concentrations of (a) 10 mg $ml^{-1}$, (b) 25 mg $ml^{-1}$, (c) 50 mg $ml^{-1}$, and (d) 200 mg $ml^{-1}$, showing an increased degree of aligned character as concentration increases. Scale bar in (a) to (d) are respectively, 5 μm, 30 μm, 50 and 30 μm.

It was also observed that varying the initial concentration of the PAN may dramatically affect the morphology and mechanical properties of the resultant monoliths; with concentrations of about 10 mg ml$^{-1}$ and thereabouts producing fibrous structures with poor alignment, but concentrations of 50 mg ml$^{-1}$ and above forming aligned macroporous structures with substantially improved mechanical strength (FIG. 5).

Figure 6:
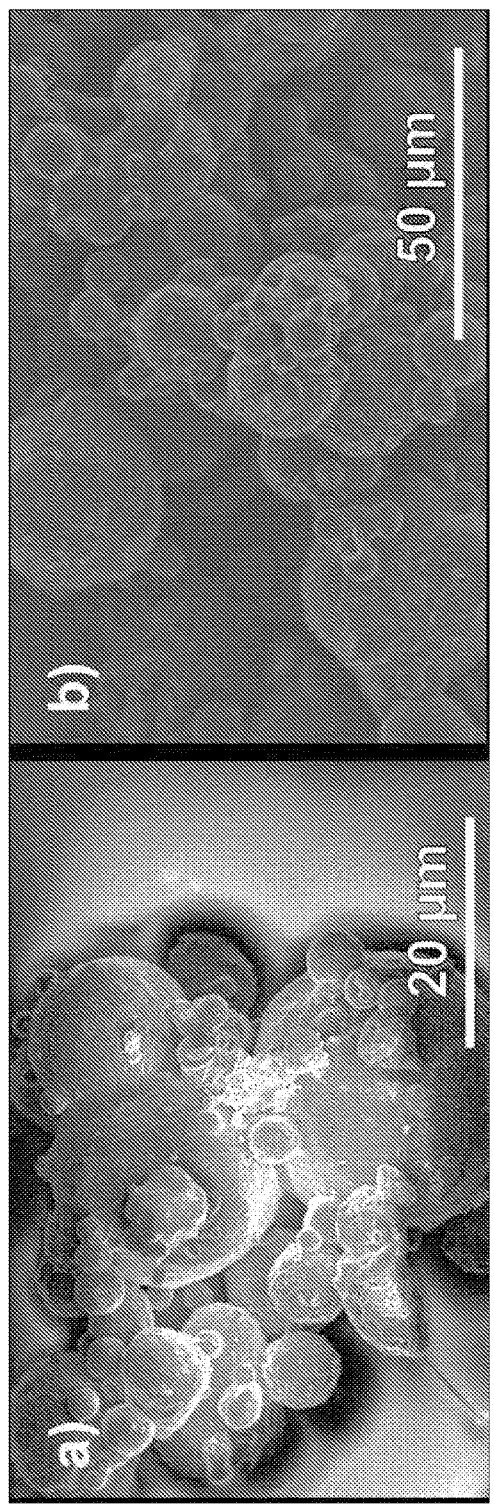
FIG. 6 shows SEM images of poly(sodium 4-styrenesulfonate) (PSS) powder prepared by atomization into $LN_2$ and subsequent lyophilization, (a) before, and (b) after pyrolysis.

FIG. 6 shows SEM images of porous PSS microparticles prepared via the direct atomization of PSS (concentration 150 mg mg$^{-1}$) onto LN$_2$ method (see Example 2), before and after pyrolysis.

Figure 7:
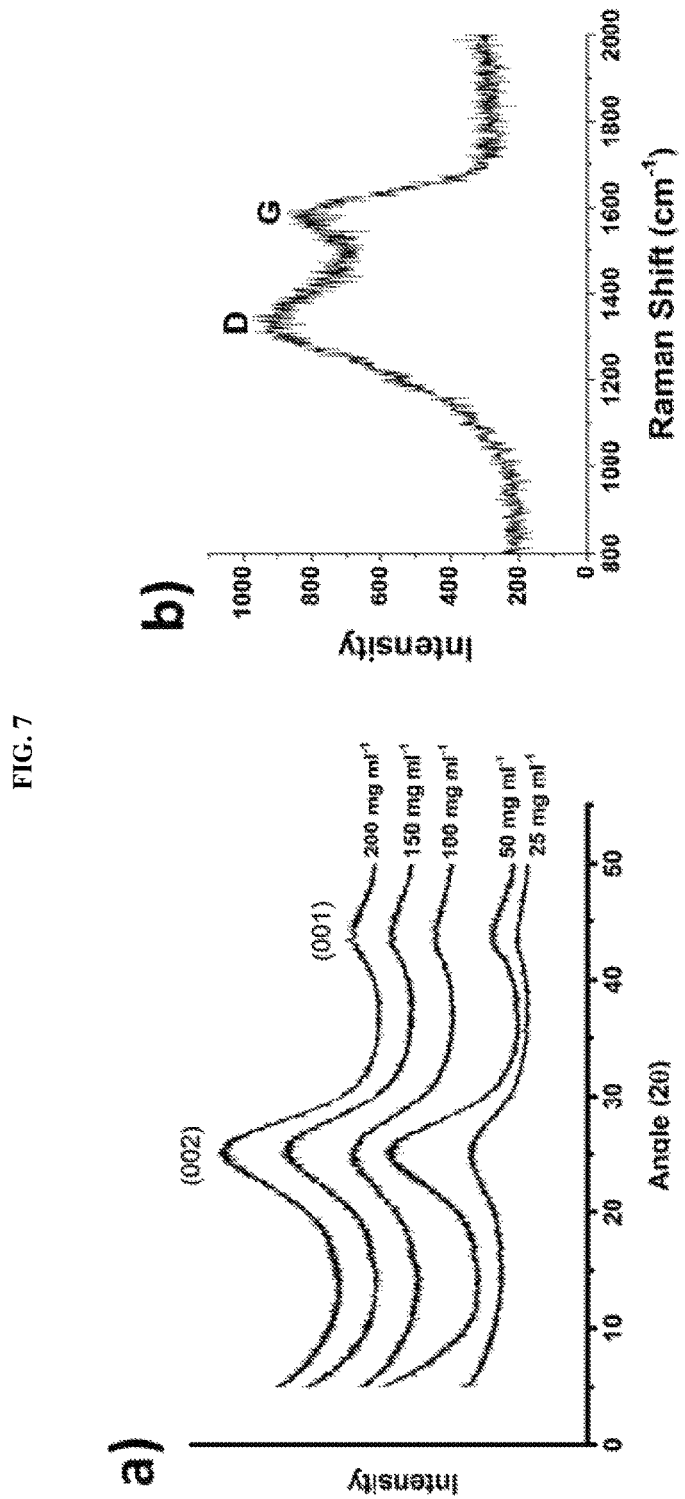
FIG. 7 are graphs showing (a) X-ray diffraction (XRD) measurements of the directionally frozen and pyrolyzed PAN monoliths at various initial concentrations, showing typical (002) and (001) Bragg diffraction peaks associated with turbostratic carbon, and (b) measurement of the Raman shift of a PAN-derived carbon monolith (initial PAN concentration of 50 mg $ml^{-1}$) showing D and G bands associated with a turbostratic carbon structure.

XRD measurements of the pyrolyzed PAN monoliths revealed typical (002) and (001) bragg diffraction peaks associated with turbostratic carbons (FIG. 7a). Raman spectroscopy measurements also confirmed the presence of turbostratic carbon, showing the characteristic D and G bands associated with disordered and graphitic carbon respectively (FIG. 7b).

Figure 8:
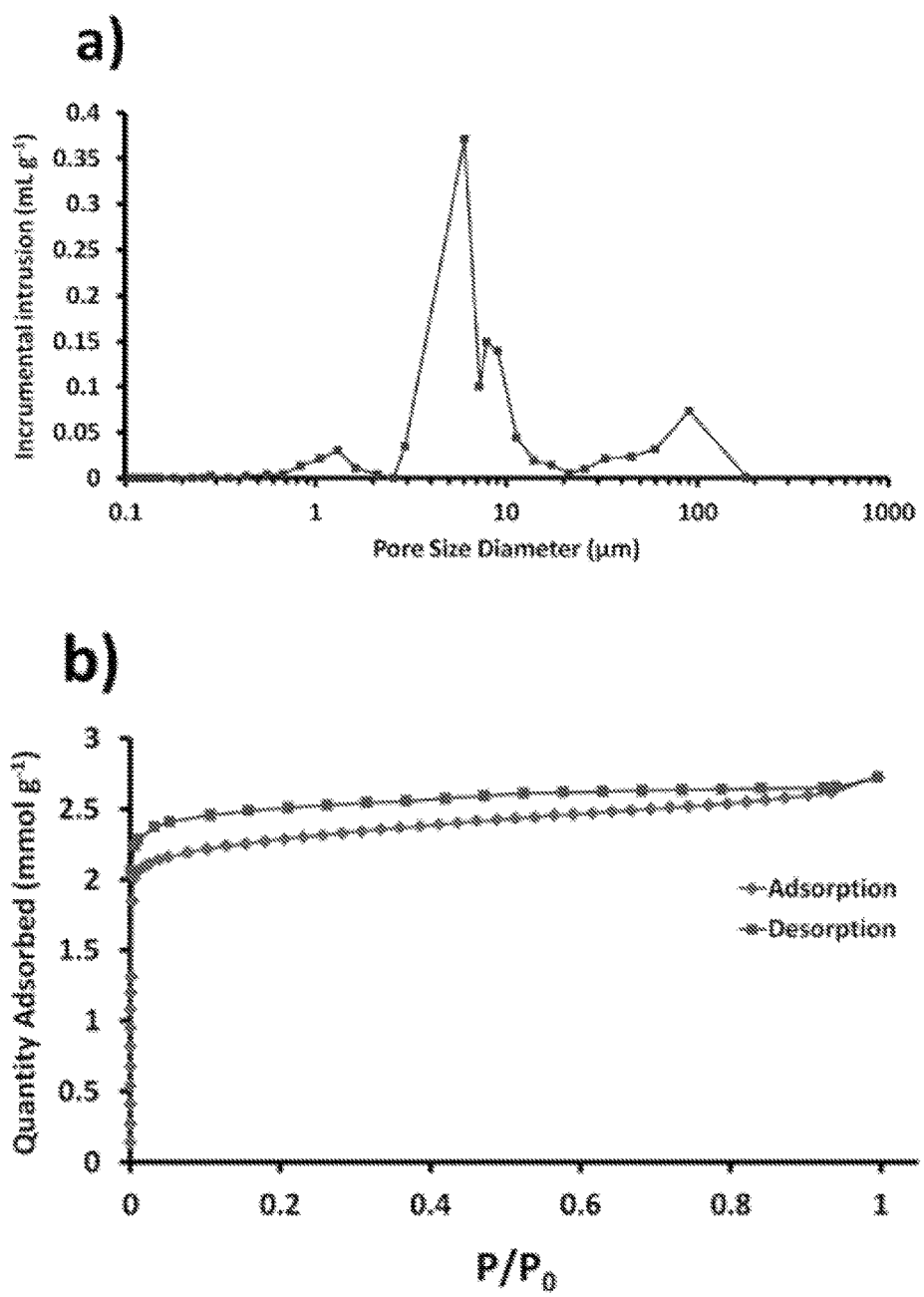
FIG. 8 are graphs showing porosity data for an aligned porous ITPC derived from an initial 50 mg $ml^{-1}$ PAN-DMSO solution showing (a) Hg-intrusion pore size distribution plot, (b) BET gas sorption isotherm, and (c) BJH and DFT (inset) gas sorption pore size analysis plots.
Figure 8:
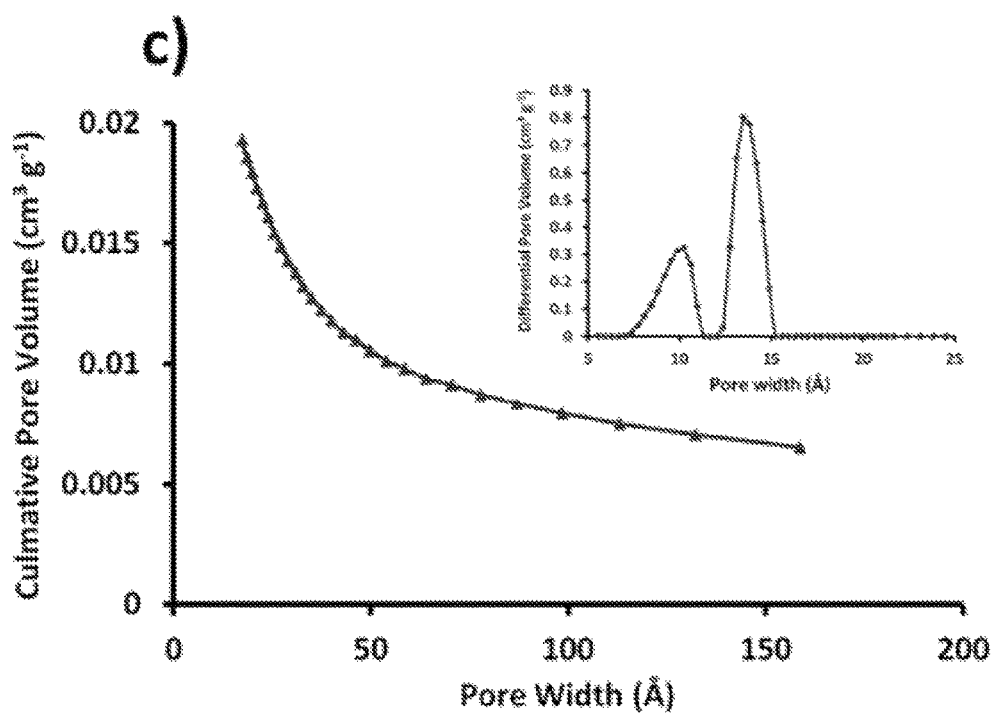

The porosity of a typical pyrolyzed PAN sample (prepared from a 50 mg ml$^{-1}$ solution) was investigated by Hg-intrusion porosimetry and $N_2$ gas-sorption. The former showed that the majority of macropores were distributed between about 2 μm and 10 μm, with fewer also centered around 1.5 μm and 100 μm (FIG. 8a). The latter gave a BET specific surface area of 172 m$^2$ g$^{-1}$, and DFT and BJH pore size-distribution plots indicated micropores centered around 1.0 nm and 1.4 nm, and a broad distribution of mesopores (FIGS. 8b and c).

Figure 9:
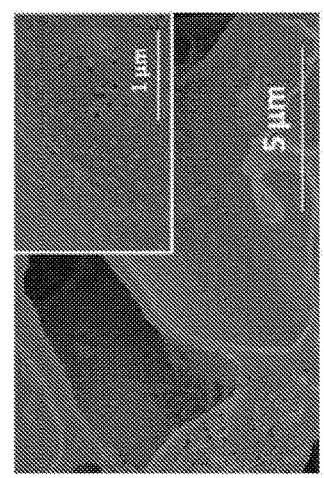
FIG. 9 shows XRD (left) and SEM image (right) depicting the presence of Si nanoparticles within an ITPC monolith. The amount of Si nanoparticles to initial polymer (by % mass) was varied from (a) 10%, (b) 20%, and (c) 100%.
Figure 9:
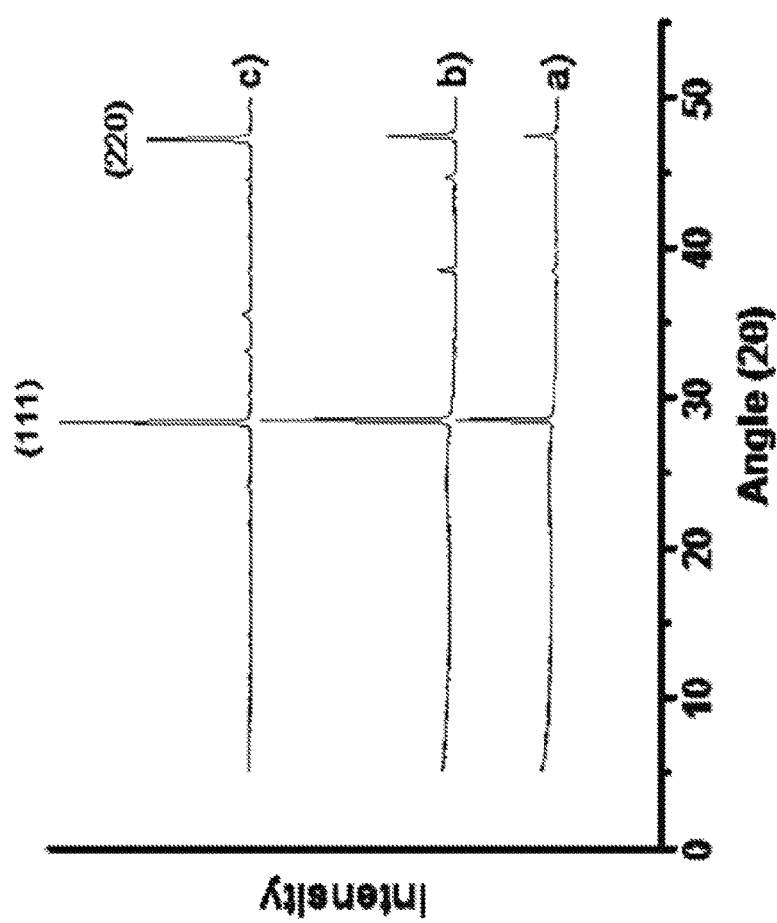
Figure 10:
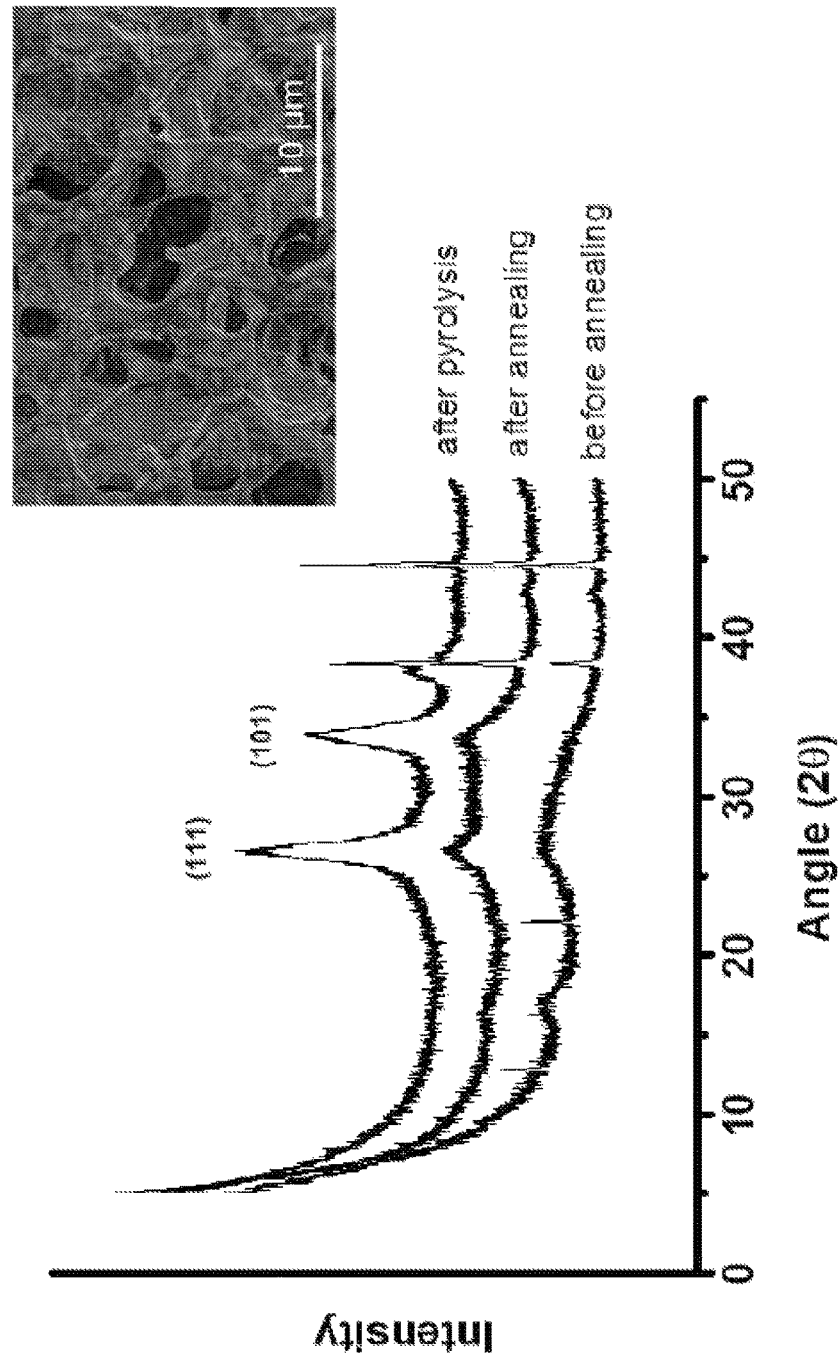
FIG. 10 shows XRD (left) and SEM (right) depicting the presence of $SnO_2$ within an ITPC monolith, after pyrolysis of a carbon-$Sn(OAc)_2$ composite.
Figure 11:
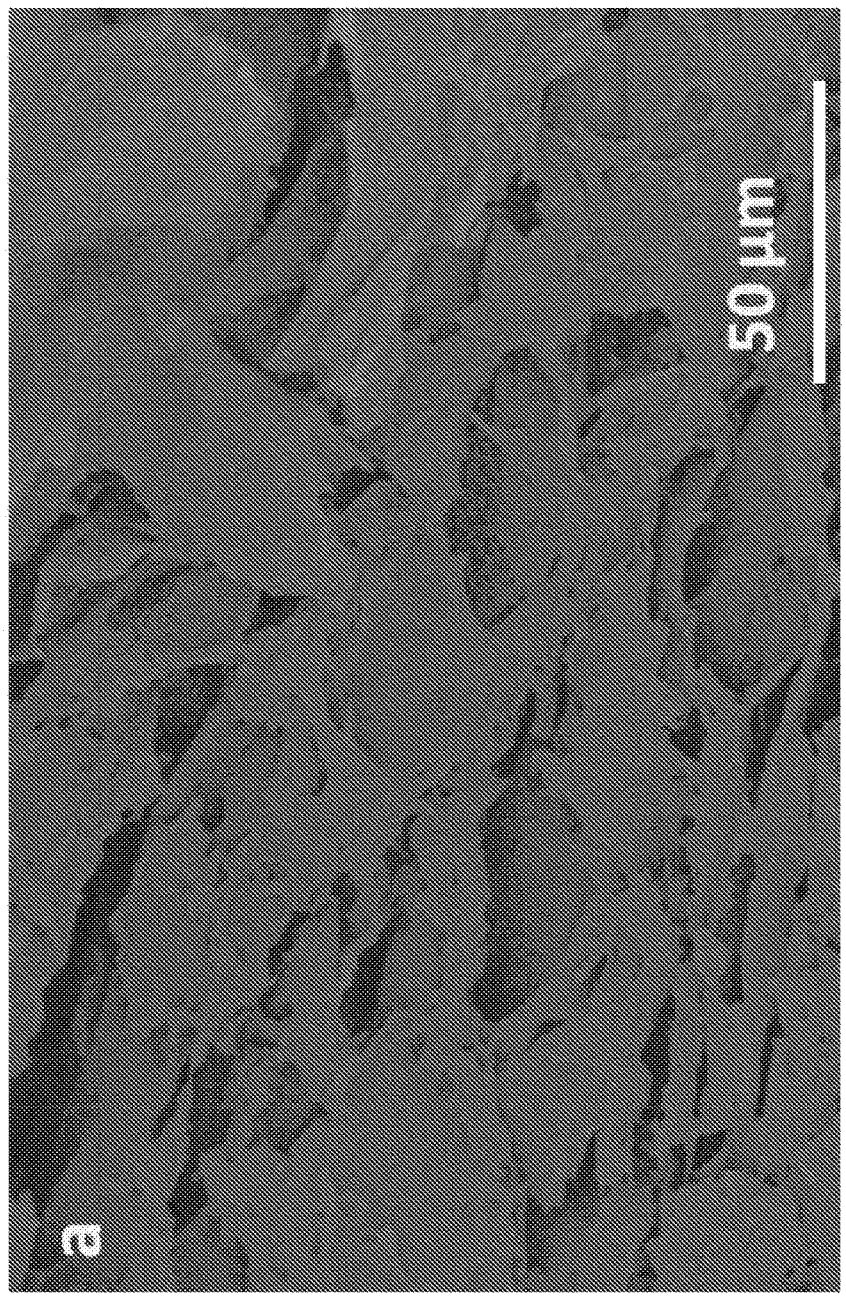
FIG. 11 shows (a) the freeze-dried PAN-graphene composite from 5% PAN+200 µl graphene solution, and (b) the corresponding structure of the carbonized sample.
Figure 11:
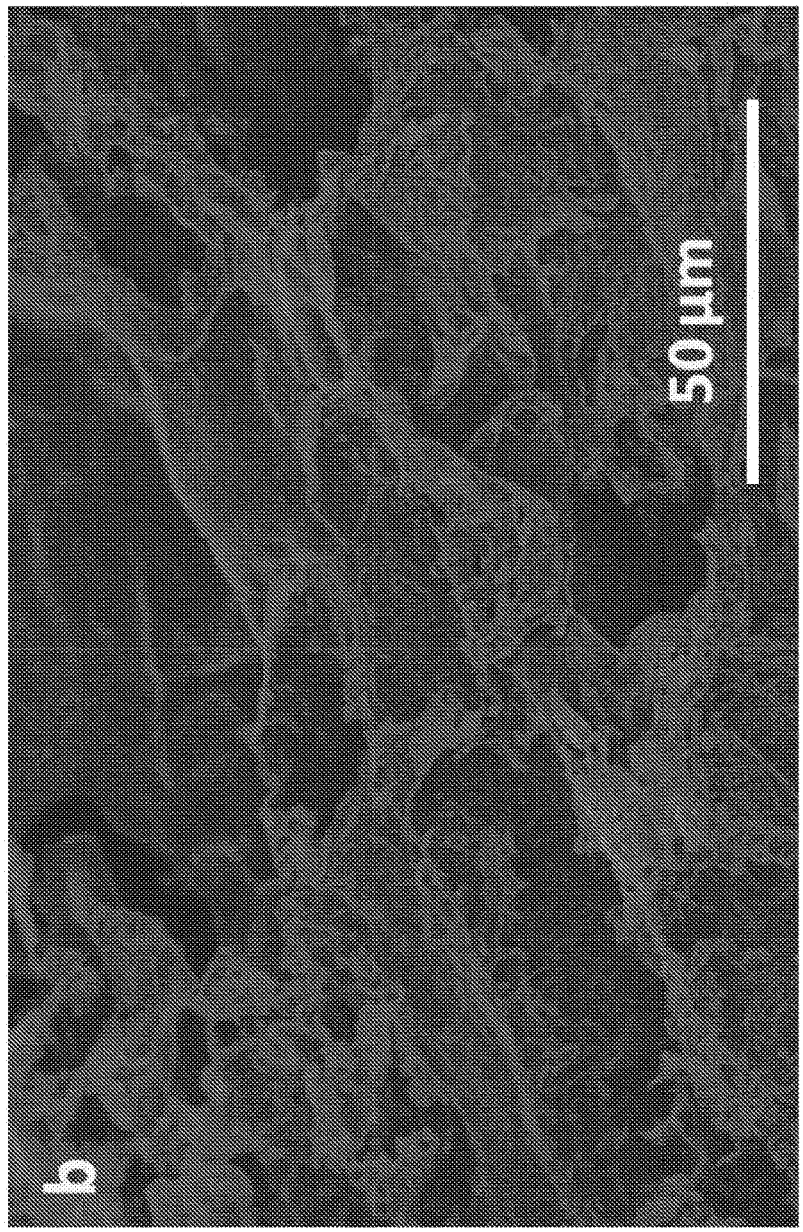
Figure 12:
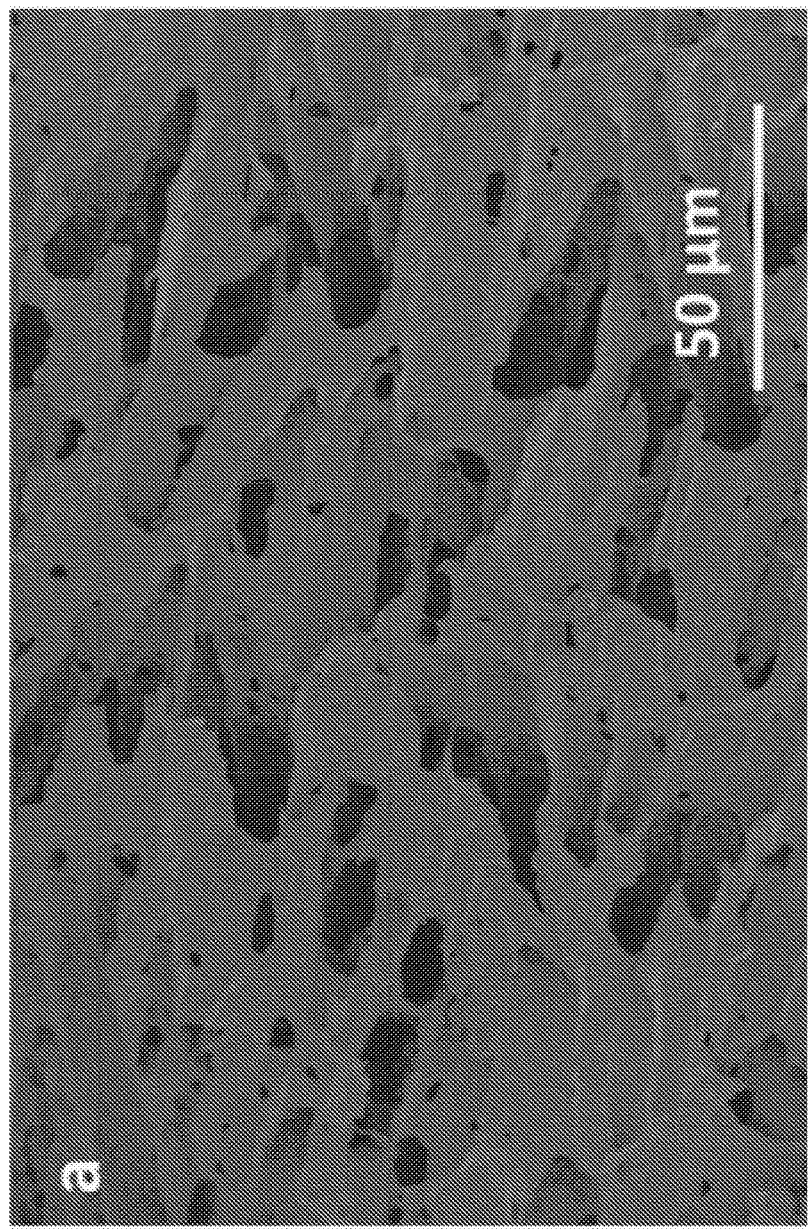
FIG. 12 shows (a) the freeze-dried structure of 5% PAN-DMSO solution incorporated with 15% melamine; and (b) the corresponding structure of the carbonized sample.
Figure 12:
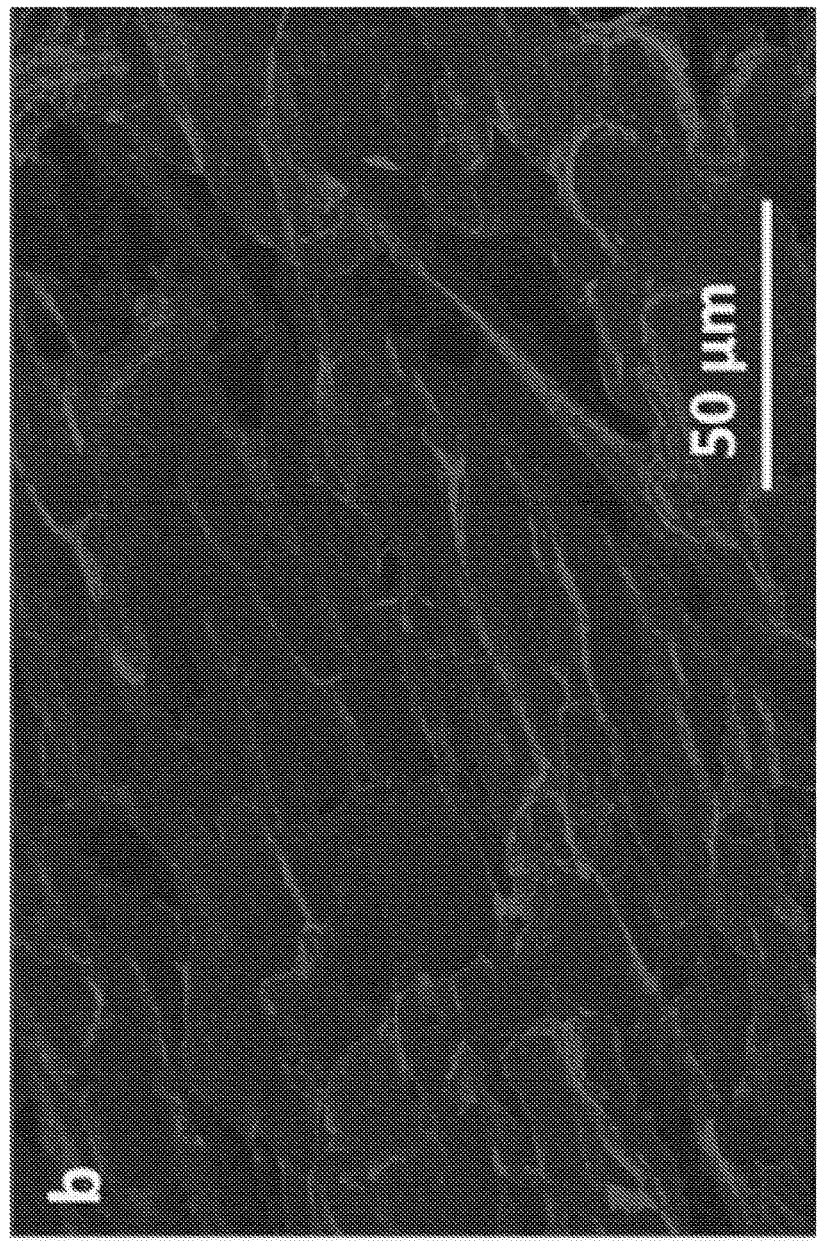

As mentioned above, various entities were easily incorporated within the carbon matrixes to form carbon composites with the goal of enhancing electrochemical performance further. Such entities included silicon nanoparticles (FIG. 9), metal salts including $Sn(OAc)_2$ (FIG. 10), $FeCl_3$, $SnCl_2$ and iron gluconate, nitrogen-rich organic compounds (melamine) (FIG. 11) and carbon nanomaterials such as graphene (FIG. 12) and CNTs. Obtaining such carbon composites via our method was remarkably simple; in most cases it simply required the dissolution or suspension of the materials within the polymer-solvent system prior to the freezing step (see Example 4).

Figure 13:
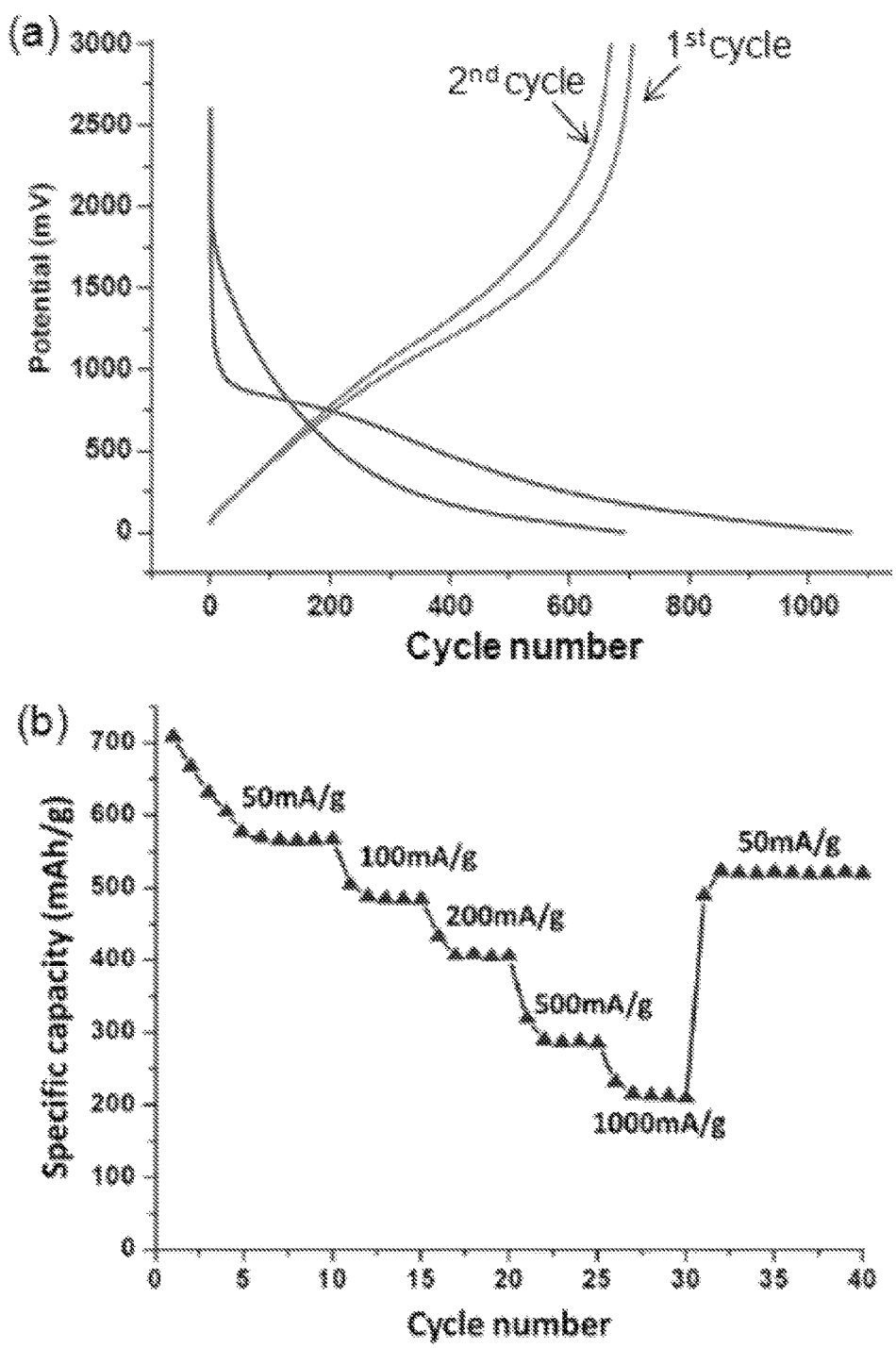
FIG. 13 shows graphs depicting electrochemical performance of PAN-derived monoliths as anode in LIBs, where (a) initial charge-discharge curves at a current density of 50 mAg$^{-1}$; and (b) charge capacities at different current densities.

The electrochemical performance of the PAN-derived carbon monoliths was evaluated as anode material for LIBs through assembling 2032 coin cells with lithium foil as the counter electrode. The initial charge/discharge curves of the carbon monolith (prepared from 5% PAN-DMSO solution) at a current density of 50 mA g$^{-1}$ and the charge capacities at different current rates are shown in FIGS. 13a and b. The material exhibits a high initial charge capacity up to 700 mA h g$^{-1}$ and a reversible charge capacity at about 550 mA h g$^{-1}$, which is higher than the capacitance of most pure carbon nanomaterials (around 450 mA h g$^{-1}$) and far exceeds that of the commercial graphite (around 300 mA h g$^{-1}$). When increasing the current rates step-by-step, the charge capacity dropped gradually and still maintained a satisfying capacity value around 200 mA h g$^{-1}$ at a current density of 1000 mA g$^{-1}$. When the current rate is tuned back to 50 mA g$^{-1}$ after cycling at different rates, the charge capacity of the carbon monoliths can be almost recovered to the original value.

Figure 14:
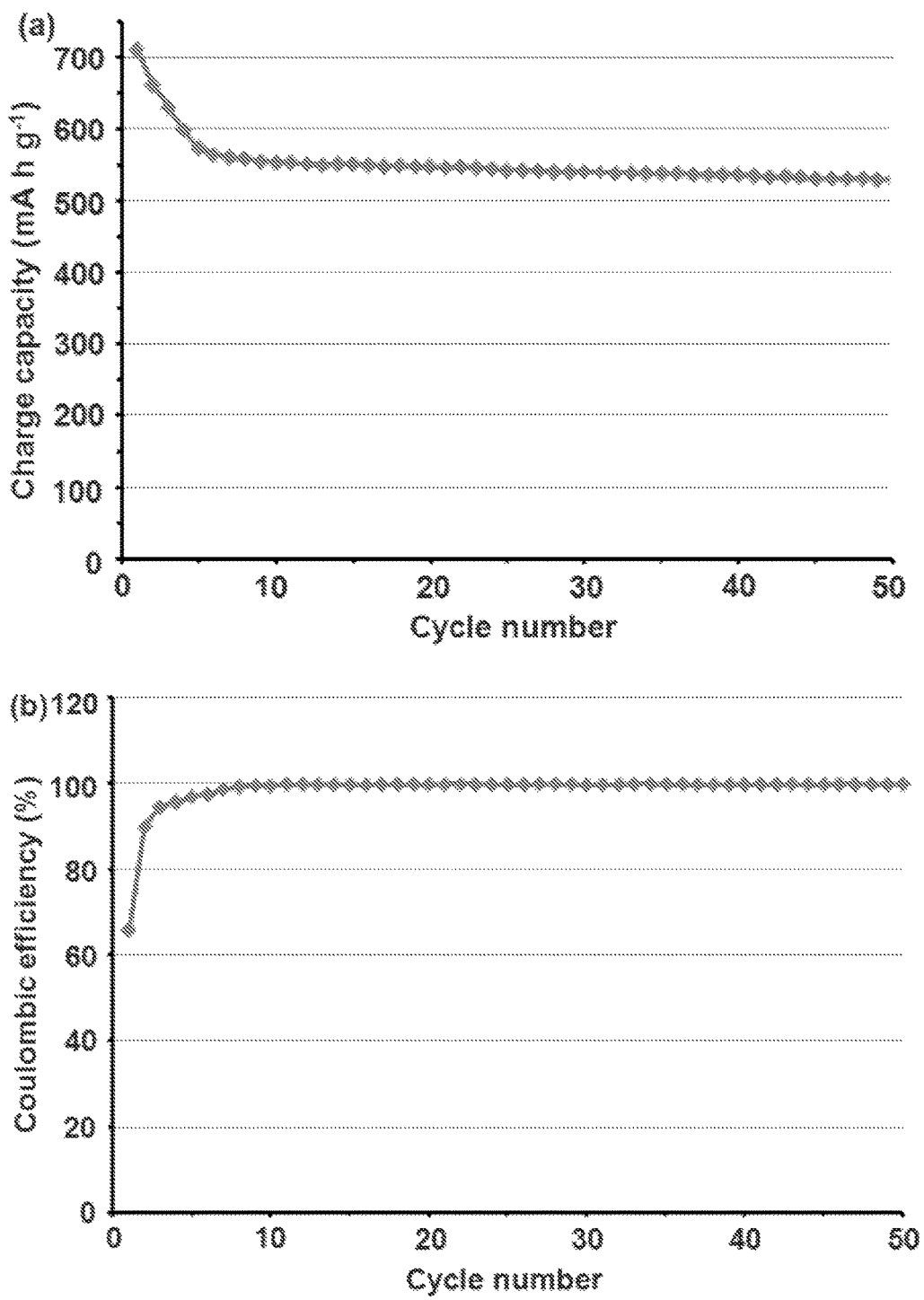
FIG. 14 shows graphs depicting (a) cyclic performance, and (b) Coulombic efficiency of PAN-derived carbon monoliths cycled at a current density of 50 mA g$^{-1}$.

FIG. 14a displays the cyclic stability of the material evaluated at a current density of 50 mA g$^{-1}$ up to 50 cycles, and the corresponding Coulombic efficiencies are shown in FIG. 14b. Although the capacities decrease obviously during the first several cycles, the carbon material still exhibit a charge capacity of 530 mA h g$^{-1}$ after 50 cycles, corresponding to a small average capacity decay of only 0.5 mA h g$^{-1}$. Furthermore, high Coulombic efficiencies (greater than 99%) were observed with all the three carbon samples after 10 cycles. The good electrochemical stability and high degree of reversibility again highlight the great promise of the materials for practical applications.

Figure 15:
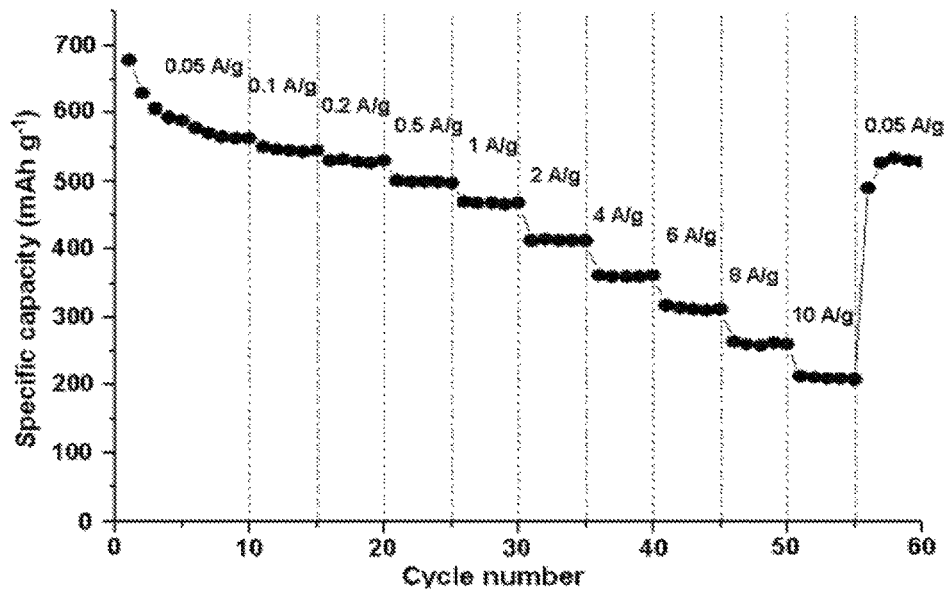
FIG. 15 is a graph showing charge capacities of carbon monoliths derived from PAN/melamine at different current densities.
Figure 16:
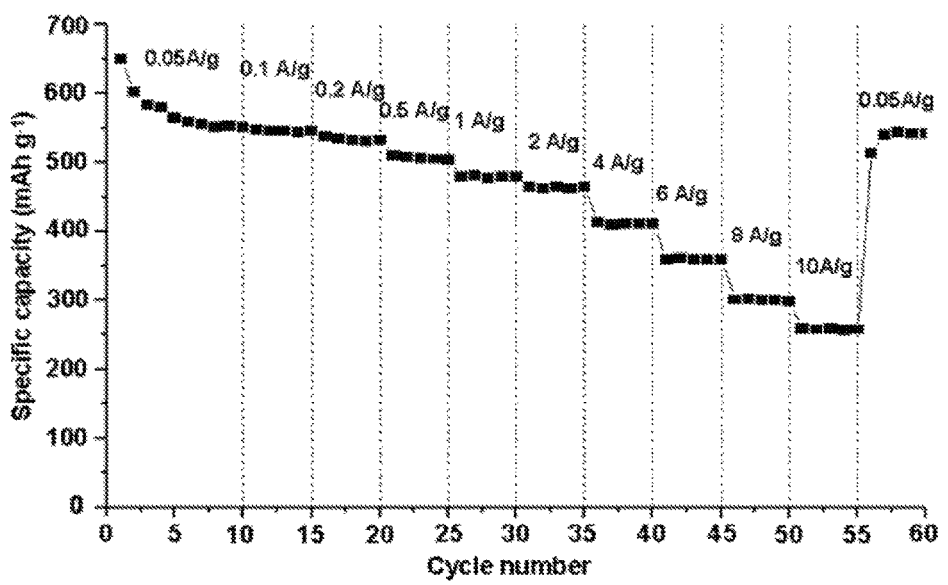
FIG. 16 is a graph showing charge capacities of carbon monoliths derived from PAN/graphene at different current densities.

The performance of the PAN-derived carbon monolith may be further improved through incorporation of different additives, as evidenced in FIG. 15 and FIG. 16. The carbon samples derived from PAN hybridized either with melamine (to induce nitrogen-doping) or graphene (to increase the electrical conductivity) exhibit similar reversible charge capacities (around 550 mA h g$^{-1}$) compared to the pure PAN-derived ones at a low current density of 50 mA g$^{-1}$, however, their rate performances at high current densities were improved significantly. Even at a very high current density of 10 A g$^{-1}$, both samples still exhibited a good charge capacity above 200 mA h g$^{-1}$, which were among the best results of pure carbon anode materials for LIBs.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing a porous carbon material comprising turbostratic carbon, the method comprising
    a) freezing a liquid mixture comprising a polymer suspended or dissolved in a solvent to form a frozen mixture, wherein the freezing comprises (i) gradually submersing a container containing the liquid mixture at a rate of about 1 mm/min to about 100 mm/min in liquid nitrogen to directional freeze the liquid mixture along the direction of movement of the container, or (ii) atomizing the liquid mixture to reduce or to separate all of the liquid mixture into tiny droplets or into a fine spray in the liquid nitrogen;
    b) removing the solvent from the frozen mixture to form a porous frozen mixture; and
    c) pyrolyzing the porous frozen mixture to obtain the porous carbon material comprising turbostratic carbon.

2. The method according to claim 1, wherein the solvent is an organic solvent.

3. The method according to claim 1, wherein the solvent is selected from the group consisting of dimethyl sulfoxide, dimethylformamide, dioxane, halogenated alkanes, maleic anhydride, propylene carbonate, dimethylacetamide, tetramethylene sulfone, gamma-butyrolactone, and combinations thereof.

4. The method according to claim 1, wherein the polymer is selected from the group consisting of polyacrylonitrile, polymethylacrylonitrile, polypyrrole, polystyrene, polyaromatic hydrocarbons, copolymers thereof, and combinations thereof.

5. The method according to claim 1, wherein the liquid mixture comprises polyacrylonitrile dissolved in dimethyl sulfoxide.

6. The method according to claim 1, wherein the solvent is an aqueous solution.

7. The method according to claim 6, wherein the polymer is selected from the group consisting of poly(sodium 4-styrenesulfonate), chitosan, alginate, lignin, polysaccharides, copolymers thereof, and combinations thereof.

8. The method according to claim 6, wherein the liquid mixture comprises poly(sodium 4-styrenesulfonate) dissolved in water.

9. The method according to claim 6, further comprising adding an acid or a base into the liquid mixture.

10. The method according to claim 1, wherein concentration of the polymer in the liquid mixture is in the range of about 0.5 wt % to about 50 wt %.

11. The method according to claim 1, wherein molecular weight of the polymer is in the range of about 50,000 g/mol to about 300,000 g/mol.

12. The method according to claim 1, wherein the frozen mixture comprises microparticles.

13. The method according to claim 1, wherein removing the solvent from the frozen mixture comprises at least one of (i) freeze drying the frozen mixture, or (ii) solvent exchange and vacuum drying the frozen mixture.

14. The method according to claim 1, wherein pyrolyzing the porous frozen mixture comprises heating the porous frozen mixture in an inert environment at a temperature in the range of about 600° C. to about 3000° C.

15. The method according to claim 1, further comprising thermally annealing the porous frozen mixture at a temperature not exceeding 280° C. prior to pyrolyzing.

16. The method according to claim 1, wherein the liquid mixture further comprises an additive selected from the group consisting of silicon nanoparticles, metal nanoparticles, metal oxide nanoparticles, metal, nitrogen-rich organic compounds, carbon nanomaterials, and combinations thereof.

17. The method according to claim 16, wherein the additive is melamine or graphene.

18. An electrode comprising the porous carbon material comprising turbostratic carbon prepared by a method comprising
   a) freezing a liquid mixture comprising a polymer suspended or dissolved in a solvent to form a frozen mixture, wherein the freezing comprises (i) gradually submersing a container containing the liquid mixture at a rate of about 1 mm/min to about 100 mm/min in liquid nitrogen to directional freeze the liquid mixture along the direction of movement of the container, or (ii) atomizing the liquid mixture to reduce or to separate all of the liquid mixture into tiny droplets or into a fine spray in the liquid nitrogen;
   b) removing the solvent from the frozen mixture to form a porous frozen mixture; and
   c) pyrolyzing the porous frozen mixture to obtain the porous carbon material comprising turbostratic carbon.

19. The electrode according to claim 18, wherein the electrode is an anode of a lithium ion battery.

20. A method of preparing a porous carbon material, the method comprising
   a) freezing a liquid mixture comprising a polymer with molecular weight in the range of about 50,000 g/mol to about 300,000 g/mol suspended or dissolved in a solvent to form a frozen mixture, wherein the freezing comprises (i) gradually submersing a container containing the liquid mixture at a rate of about 1 mm/min to about 100 mm/min in liquid nitrogen to directional freeze the liquid mixture along the direction of movement of the container, or (ii) atomizing the liquid mixture to reduce or to separate all of the liquid mixture into tiny droplets or into a fine spray in the liquid nitrogen;
   b) removing the solvent from the frozen mixture to form a porous frozen mixture; and
   c) pyrolyzing the porous frozen mixture to obtain the porous carbon material.

* * * * *

UNITED STATES PATENT AND TRADEMARK OFFICE
CERTIFICATE OF CORRECTION

PATENT NO. : 10,181,618 B2
APPLICATION NO. : 15/329829
DATED : January 15, 2019
INVENTOR(S) : Aled Deakin Roberts et al.

Page 1 of 1

It is certified that error appears in the above-identified patent and that said Letters Patent is hereby corrected as shown below:

In the Claims

Claim 16
Please replace the phrase "metal oxide nanoparticles, metal, nitrogen-rich organic compounds" with
---metal oxide nanoparticles, metal salts, nitrogen-rich organic compounds---

Signed and Sealed this
Twelfth Day of March, 2019

Andrei Iancu
*Director of the United States Patent and Trademark Office*